United States Patent [19]
Stamos et al.

[11] Patent Number: 5,910,244
[45] Date of Patent: Jun. 8, 1999

[54] ADAPTABLE CONTROL VALVE FOR FLUID TREATMENT SYSTEM

[75] Inventors: Theodore C. Stamos, Spring, Tex.; Stephen L. Galbraith, Mequon; Thomas P. Honzelka, Grafton, both of Wis.

[73] Assignee: Autotrol Corporation, Milwaukee, Wis.

[21] Appl. No.: 08/906,203

[22] Filed: Aug. 5, 1997

Related U.S. Application Data

[63] Continuation of application No. PCT/US97/01133, Jan. 21, 1997
[60] Provisional application No. 60/011,150, Jan. 26, 1996.
[51] Int. Cl.$^6$ .............................. B01D 24/46; F17D 3/16
[52] U.S. Cl. ................ 210/138; 137/624.18; 137/624.2; 210/120; 210/140; 210/190; 210/277
[58] Field of Search ..................... 210/120, 139, 210/140, 141, 142, 143, 190, 191, 277, 278, 426–428, 541, 138; 137/624.18, 624.19, 624.2, 599.1, 883, 885, 625.5

[56] References Cited

U.S. PATENT DOCUMENTS

| | | | |
|---|---|---|---|
| 2,665,251 | 1/1954 | Mendenhall | 137/624.2 |
| 3,352,419 | 11/1967 | Entringer et al. | 210/140 |
| 3,441,047 | 4/1969 | Lyall et al. | 137/624.2 |
| 3,701,360 | 10/1972 | Morrison | 137/454.6 |
| 3,794,061 | 2/1974 | Horvath et al. | 137/330 |
| 3,867,961 | 2/1975 | Rudelick | 137/625.29 |
| 3,960,166 | 6/1976 | Linser | 137/271 |
| 4,269,028 | 5/1981 | Hattori | 60/276 |
| 5,273,070 | 12/1993 | Chili et al. | 137/599.1 |

*Primary Examiner*—Joseph W. Drodge
*Attorney, Agent, or Firm*—Quarles & Brady

[57] ABSTRACT

A control valve for a fluid treatment system, such as a water softener or a water filter, includes a manifold which mounts a pair of open-ended, cylindrical valve bodies having ports in fluid communication with passages in the manifold. Interchangeable single and double poppet valve assemblies are received into the open ends of the valve body. The poppet valve assemblies have diaphragm valve actuators disposed between chambers that are in fluid communication with selective ones of an array of pilot valves that are also mounted on the manifold. The valve assemblies may be piloted to one position by a spring. A tank adapter connects the manifold to a treatment tank. The tank adapter can be connected to the manifold in two alternate alignments which connect passages in the manifold to the top and bottom of the treatment tank so that co-current or countercurrent flow of regenerative fluid and the fluid to be treated can be alternately selected. A variety of sequences of flow paths can be selected by selection of the interchangeable poppet valve assemblies, by plugging selected ports in the valve housing, and by capping open, unused ends of the valve bodies.

28 Claims, 28 Drawing Sheets

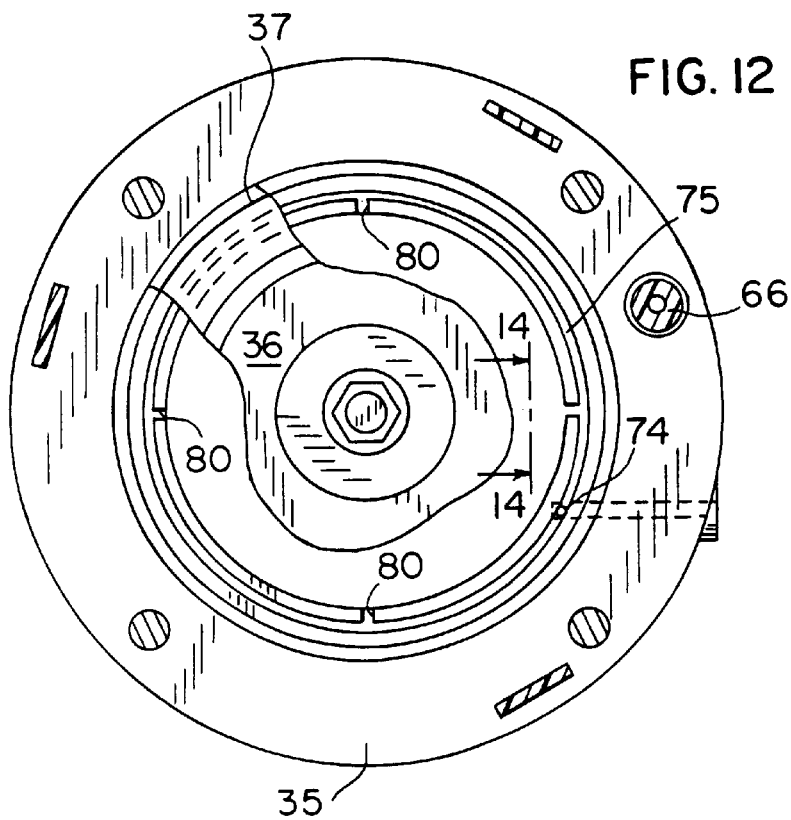
FIG. 12
FIG. 14
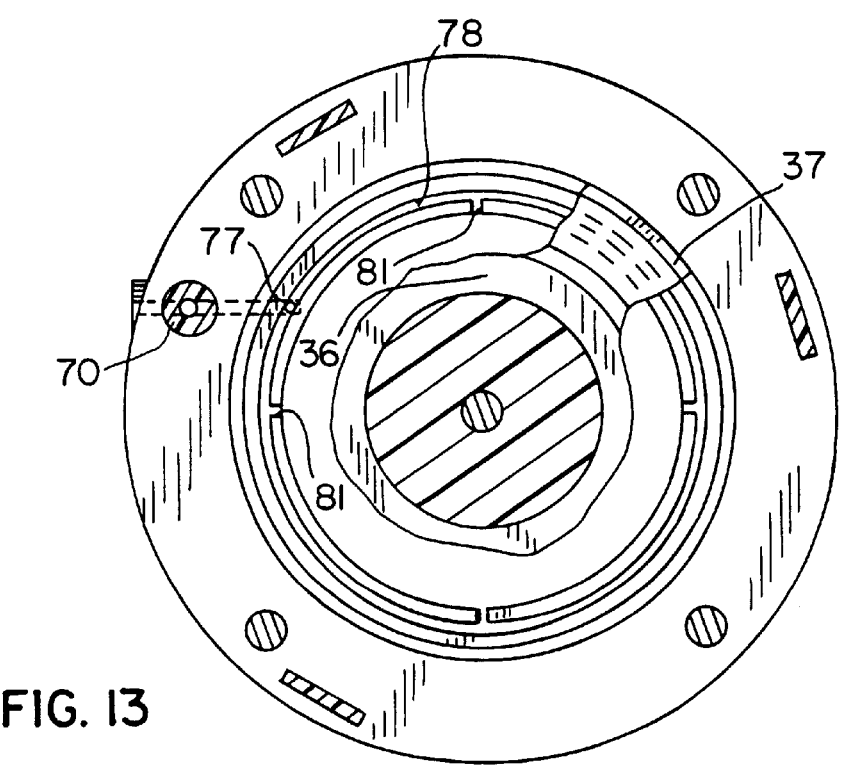
FIG. 13

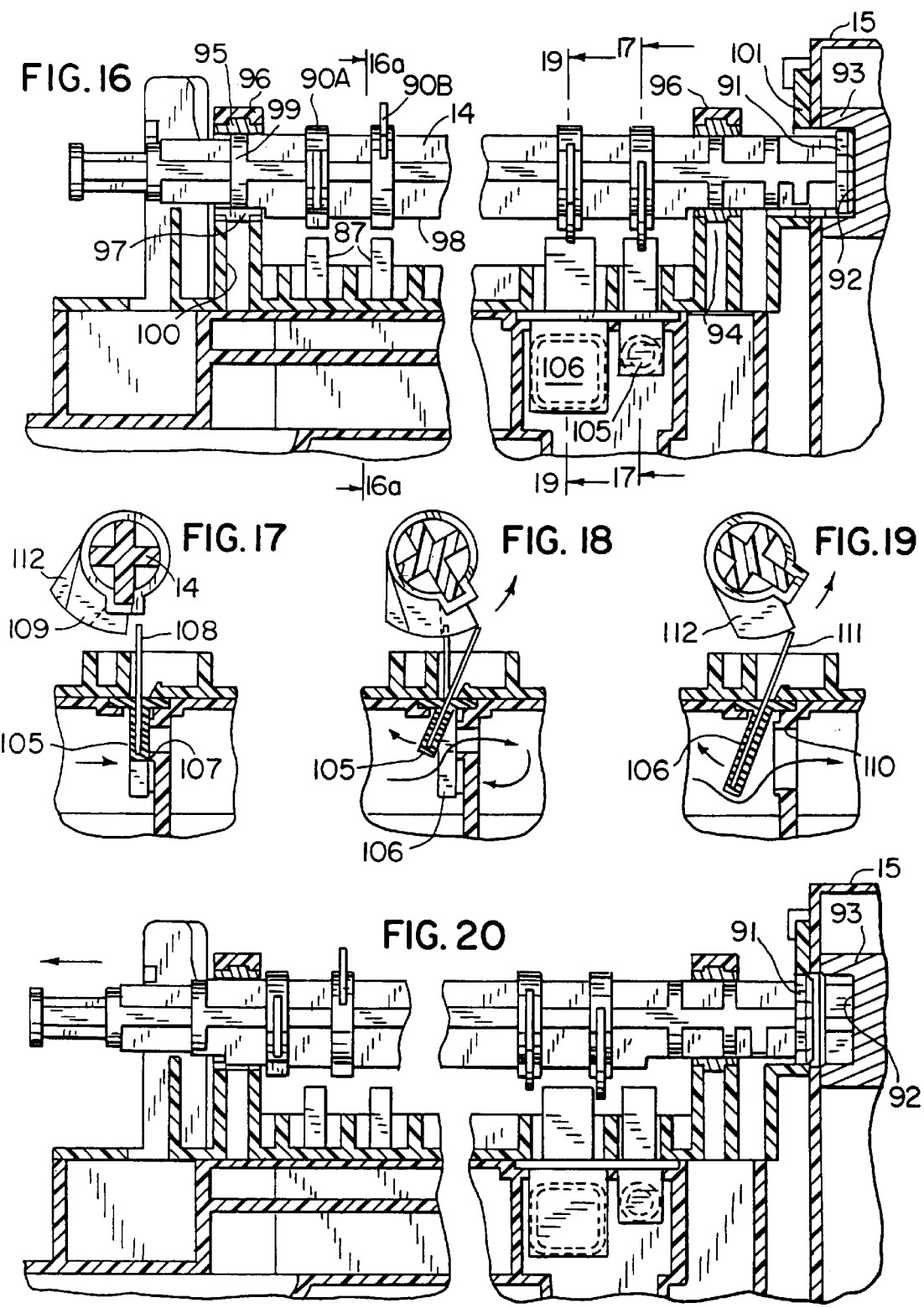

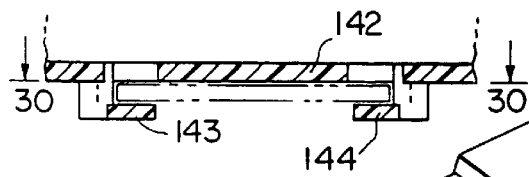
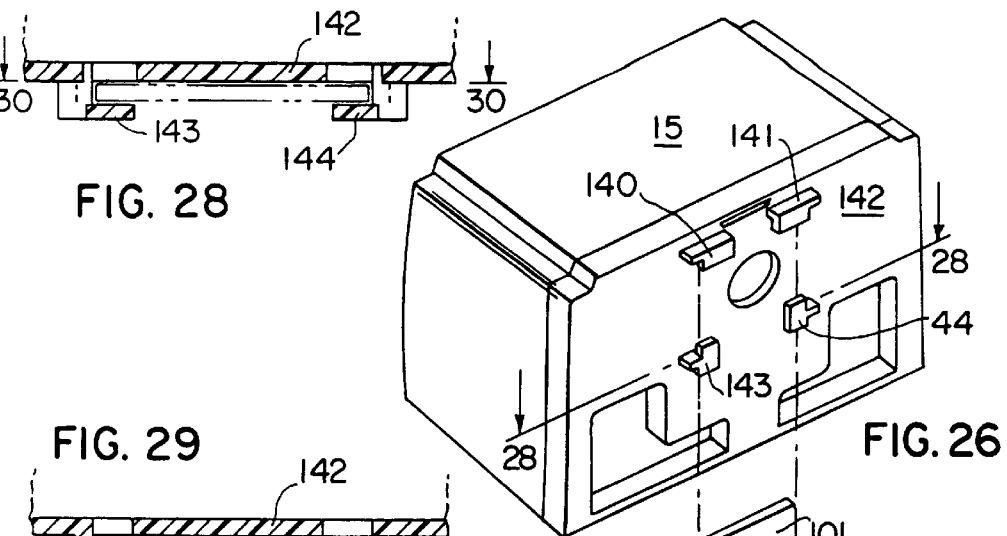
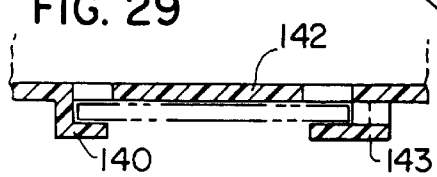
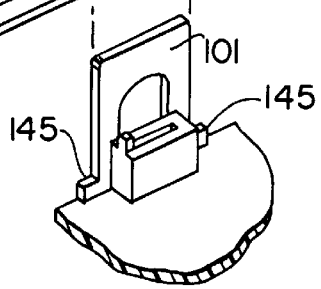
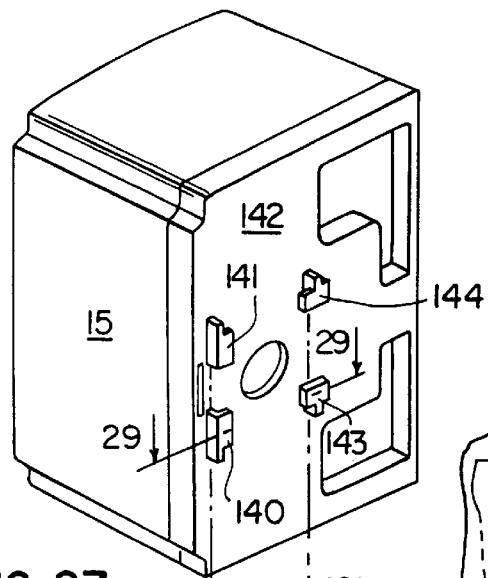
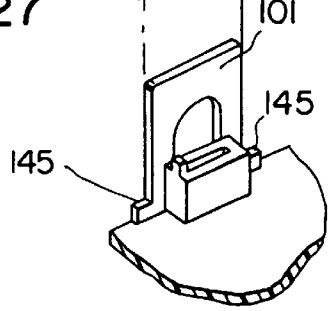
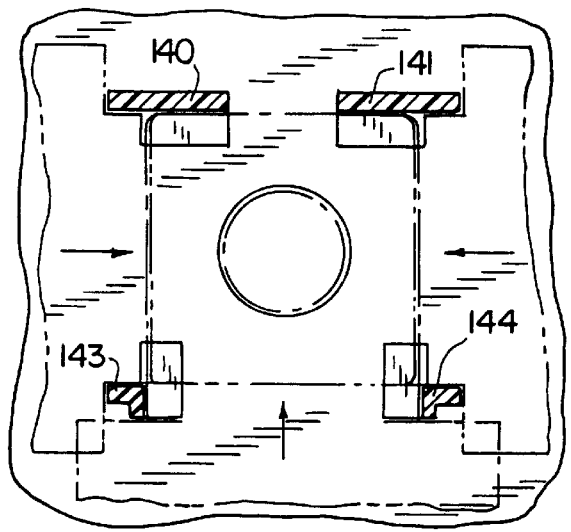

ADAPTABLE CONTROL VALVE FOR FLUID TREATMENT SYSTEM

This application claims the benefit of provisional patent application No. 60/011,150 filed Jan. 26, 1996, and international patent application No. PCT/US97/01133 filed Jan. 21, 1997.

BACKGROUND OF THE INVENTION

This invention relates to a control valve for a fluid treatment system, such as a water softener or water filter, which includes a treatment bed that requires periodic backwashing, and particularly to a control valve that is adaptable to control various cycles of operation of the system and various combinations of cycles, including permitting a selection of co-current or countercurrent operation, and either allowing or preventing untreated fluid to pass to service lines during backwash or regeneration.

Filter beds require periodic backwashing. The control of the backwashing is usually accomplished by valving which is responsive to a timer that calls for the backwashing under predetermined conditions or at predetermined time intervals. Backwash is often followed by a rinse cycle which is controlled by the same valving.

Both water softener resin beds and regenerable filter beds also require periodic backwashing as well as the periodic introduction of a regenerative fluid, such as brine or potassium permanganate, to the bed. Rinsing cycles are also typically involved in the backwashing and regeneration. The backwash, rinse, and regeneration cycles are again typically controlled by valving that is actuated by a motor controlled by a timer and often responsive to the volume of usage to which the bed has been subjected since the last regeneration. In a water softener, the valving is typically mounted on the top of a tank that contains the resin bed. A tube extends downwardly through the bed and is in fluid communication with the bottom of the bed. The valving communicates with the top of the resin bed and with the bottom of the resin bed via the tube so that various fluids can be passed down through the bed, and up through the bed.

Regeneration of a water softener resin bed is sometimes accomplished in a direction that is co-current with the flow of water to be treated and is sometimes accomplished in a direction that is countercurrent to the flow of water being treated. Also, some water softener valving is arranged to allow the passage of untreated water to the service lines during backwash, rinse, and regeneration, while other softener valving is arranged to block the flow of untreated water to the service line during such cycles.

It is a principal object of the invention to provide a control valve that is adaptable to control the relatively simple cycles of service, backwash, and rinse in a filter bed and which is also adaptable to controlling the more complex cycles required for a bed that needs to be regenerated.

It is also an object of the invention to provide such an adaptable control valve which can alternately regenerate co-current with the flow of treated fluid and countercurrent with such flow.

It is another object to provide such a control valve that can alternately allow untreated fluid to flow to service lines during backwash and/or regeneration and to block such flow.

SUMMARY OF THE INVENTION

In accordance with the invention, a control valve is provided that includes an array of pilot valves and a mechanism for actuating the pilot valves in a controlled sequence. The control valve further includes a manifold connectable to a tank containing a fluid treatment bed. An open-ended cylindrical valve body is attached to the manifold and has ports in fluid communication with passages in the manifold. The control valve further includes interchangeable poppet valve assemblies that are received into the open ends of the valve body and which include valve actuators that are in fluid communication with respective ones of the pilot valves.

The poppet valve assemblies may include single face seal poppet valves and double face seal poppet valves. The poppet valve assemblies may be piloted to all positions of operation or may include return springs. The double face seal poppet valves may be disposed on opposite sides of a pair of valve seats disposed on either side of a port in a valve housing such that the double face seal poppet valves seal one valve seat while the other valve seat is opened, or allow both valve seats to be opened at the same time. The valve seats may be formed as a part of the poppet valve assemblies. Preferably, the valve seats are formed on one side surface of rings carrying seals that seal with the inner surface of the valve body between ports in the valve body with the rings being part of a cage structure that extends into the open ends of the valve body.

The valve actuators are preferably diaphragms connected to valve stems which mount the face seal poppet valves. The diaphragms are disposed between chambers that may be in fluid communication with respective ones of the pilot valves. The diaphragm chambers are preferably connected to the cage structure which supports and includes the rings.

Preferably, a means is provided for automatically purging air from a diaphragm chamber when the chamber fills with fluid from the pilot valves.

In the preferred embodiment, a pair of open-ended valve bodies are mounted on the manifold.

Further in accordance with the invention, the control valve may be adapted for controlling the cycles of operation of a water softener system having an ion exchange resin bed or similar bed which requires periodic regeneration from a source of regenerative fluid. The manifold has fluid passages connectable to the top and bottom of the resin bed and to the source of regenerative fluid. A tank adapter connects the manifold to the top of the tank. The tank adapter is preferably connectable to the manifold in two alternate alignments which connect passages in the manifold to the top and bottom of the resin bed via passages in the adapter such that co-current or countercurrent flow of regenerative fluid and the fluid to be treated can be alternately selected.

By a suitable selection of single and double poppet valve assemblies which are inserted into the open ends of the valve housings, and with the plugging of selected ports in the valve housing, a variety of flow paths for fluid to be treated and for regenerative fluid, as well as backwash and rinse fluid, can be selected. Accordingly, the same basic components can be adapted to a variety of fluid treatment bed systems to provide the desired flow patterns for a variety of cycles of operation, including service, backwash, rinse, regeneration, and purge.

Further in accordance with the invention, the pilot valves are flapper valves having valve stems that are engaged by cams on a rotating cam shaft driven by a timer mechanism. Valves for connecting the source of regenerative fluid to the bed and to the fluid to be treated include a pair of flapper valves controlled by the cam shaft. The pair of flapper valves are arranged in parallel with one flapper valve opening a small orifice against pressure before the second flapper valve opens a larger orifice against pressure.

Also in accordance with the invention, the array of pilot valves includes an upstanding wall that removably mounts the timer mechanism, and the timer mechanism is mountable in alternate positions on the wall.

The foregoing and other objects and advantages of the invention will appear in the following detailed description. In the description, reference is made to the accompanying drawings which illustrate preferred embodiments of the invention.

BRIEF DESCRIPTION OF THE DRAWINGS

FIG. 12 is a view in elevation with portions broken away of the outer diaphragm chamber housing and viewed in the plane of the line 12—12 in FIG. 9;

FIG. 13 is a view in elevation and partially broken away of the inner chamber housing and viewed in the plane of the line 13—13 of FIG. 9;

FIG. 14 is a view in section through the diaphragm and viewed from the plane of the line 14—14 of FIG. 12;

FIG. 16 is a foreshortened view in elevation and partially in section of a cam shaft and flapper valve array;

FIG. 17 is a view in elevation and partially in section taken in the plane of the line 17—17 in FIG. 16;

FIG. 18 is a view similar to FIG. 17 but showing a cam moving a flapper valve to an open position;

FIG. 19 is a view in elevation taken in the plane of the line 19—19 in FIG. 16;

FIG. 20 is a view similar to FIG. 16 but showing the cam shaft moved axially to allow the timer assembly to be removed;

FIG. 26 is an exploded view in perspective showing one orientation for mounting the timer assembly on the control valve;

FIG. 27 is a view similar to FIG. 26 but showing a second orientation of the timer assembly;

FIG. 28 is a view in section taken in the plane of the line 28—28 in FIG. 26;

FIG. 29 is a view in section taken in the plane of the line 29—29 in FIG. 27;

FIG. 30 is a view in elevation and partially in section taken in the plane of the line 30—30 in FIG. 28;

DETAILED DESCRIPTION OF THE PREFERRED EMBODIMENTS

Figure 1:
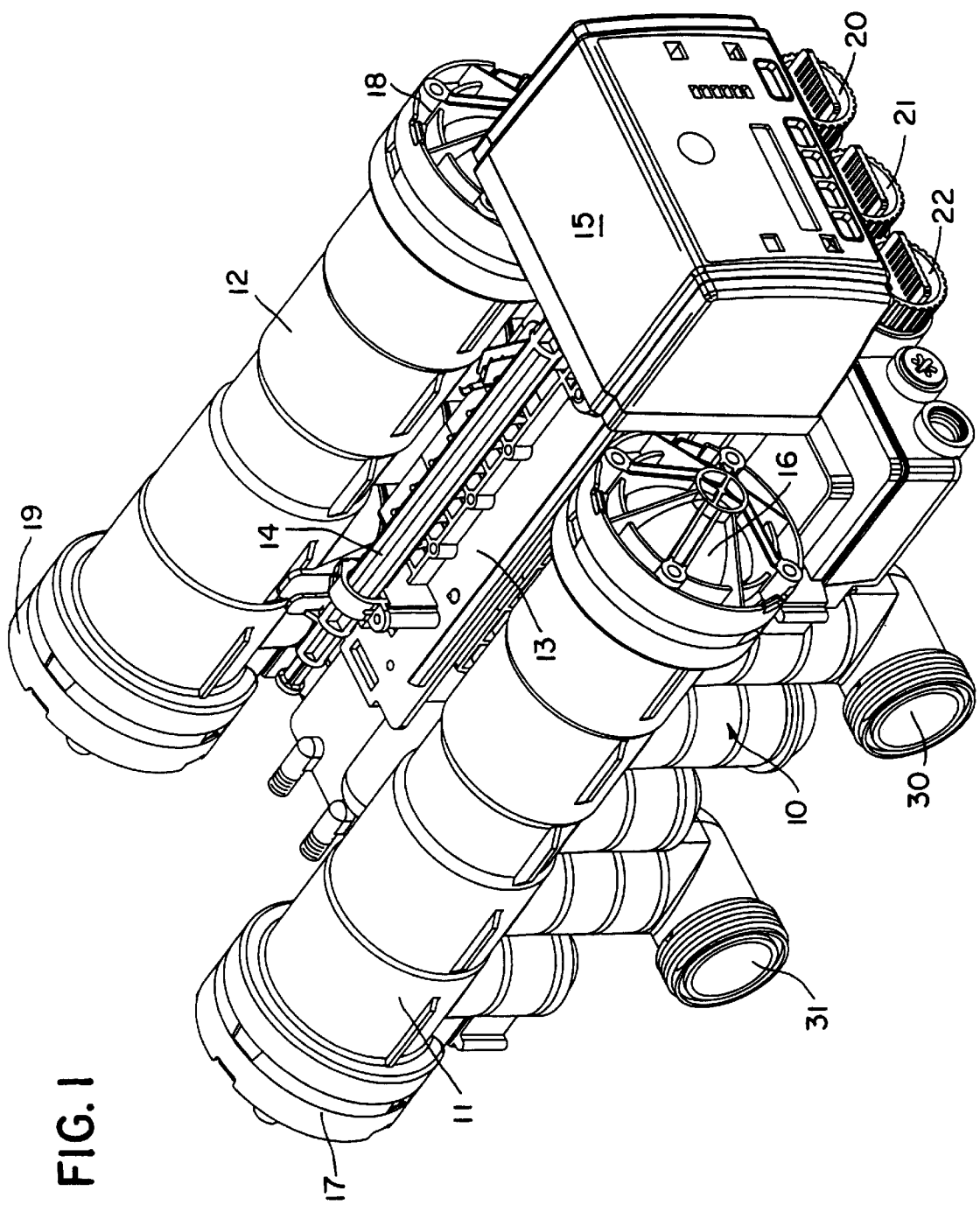
FIG. 1 is a view in perspective of a control valve in accordance with the invention viewed from the front timer end of the valve.
Figure 2:
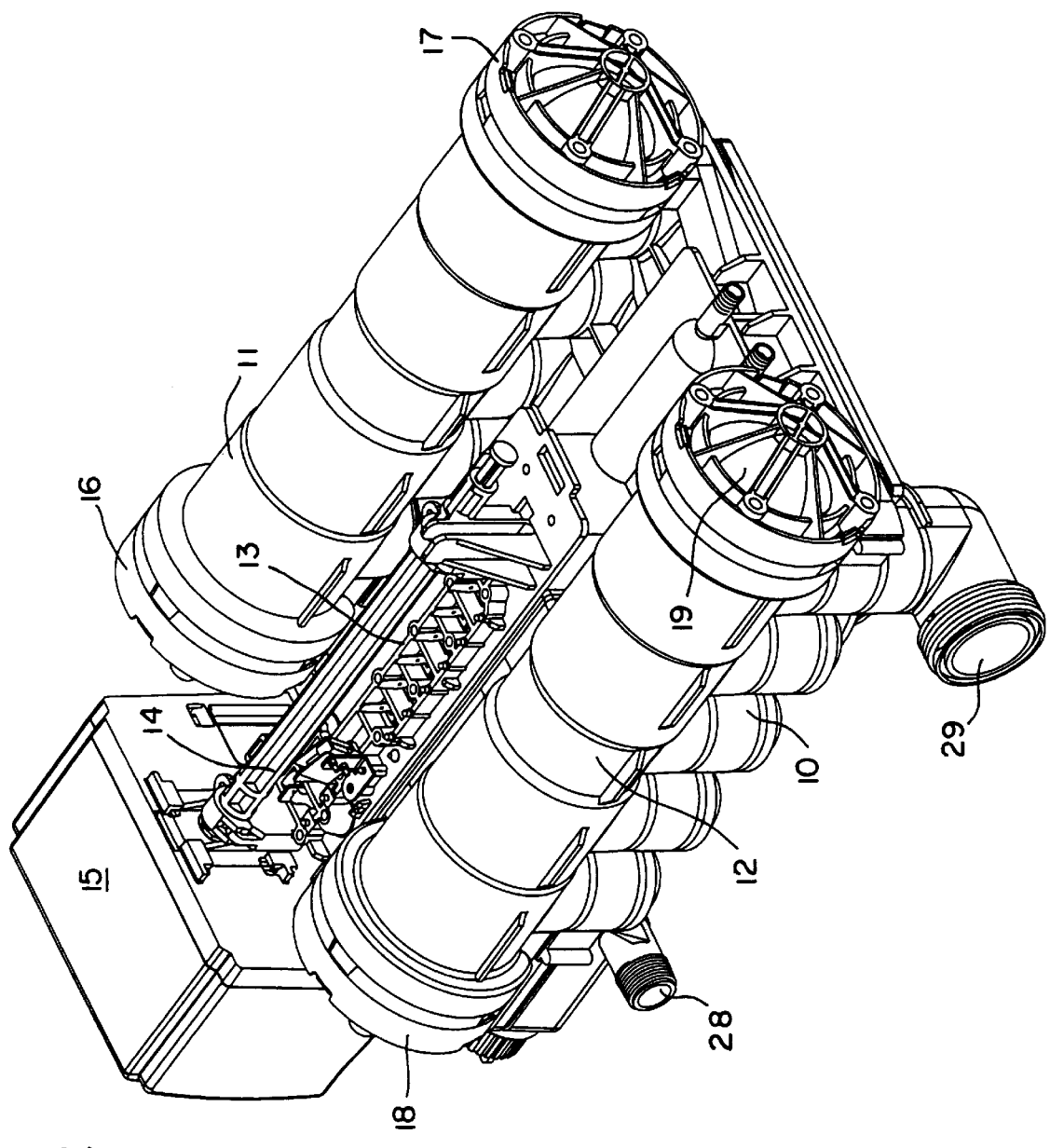
FIG. 2 is a view in perspective of the control valve of FIG. 1 viewed from the rear.
Figure 3:
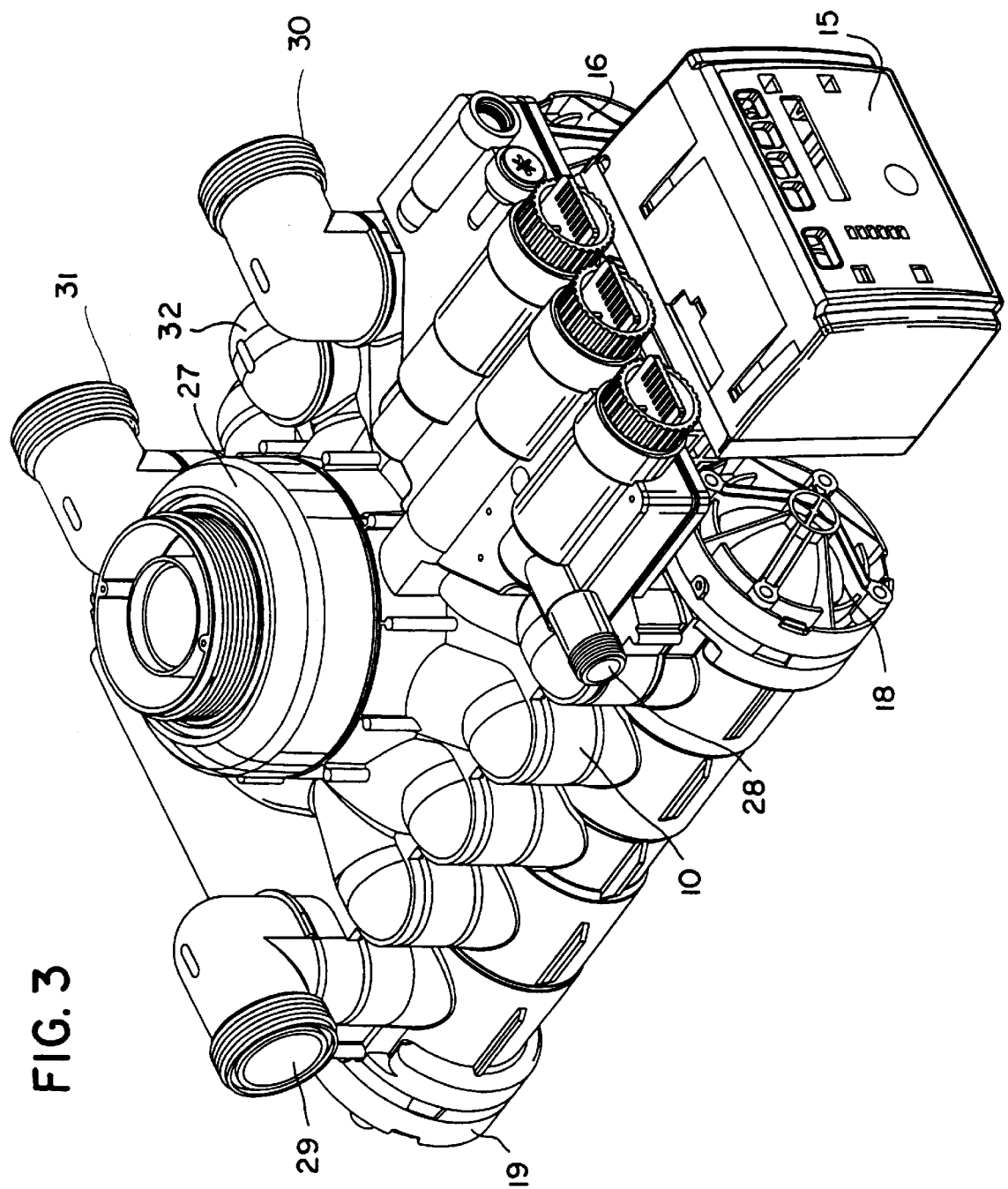
FIG. 3 is a view in perspective of the control valve viewed from the bottom.

Referring to FIGS. 1 through 3, a control valve in accordance with the invention is formed of a manifold assembly 10 to which are connected a pair of spaced cylindrical valve bodies 11 and 12. A flapper valve assembly 13 is mounted on the manifold 10 between the valve bodies 11 and 12. A timer assembly 15, including an electric timer motor (not shown), is mounted on the end of the flapper valve assembly 13 and a cam shaft 14 is rotated by the timer assembly 15 and is supported in the flapper valve assembly 13. The timer assembly 15 may be of known construction and operation. A brine refill flow control assembly 20, an educator assembly 21, and a pressure regulator assembly 22 are mounted into openings in the manifold 10.

Figure 4:
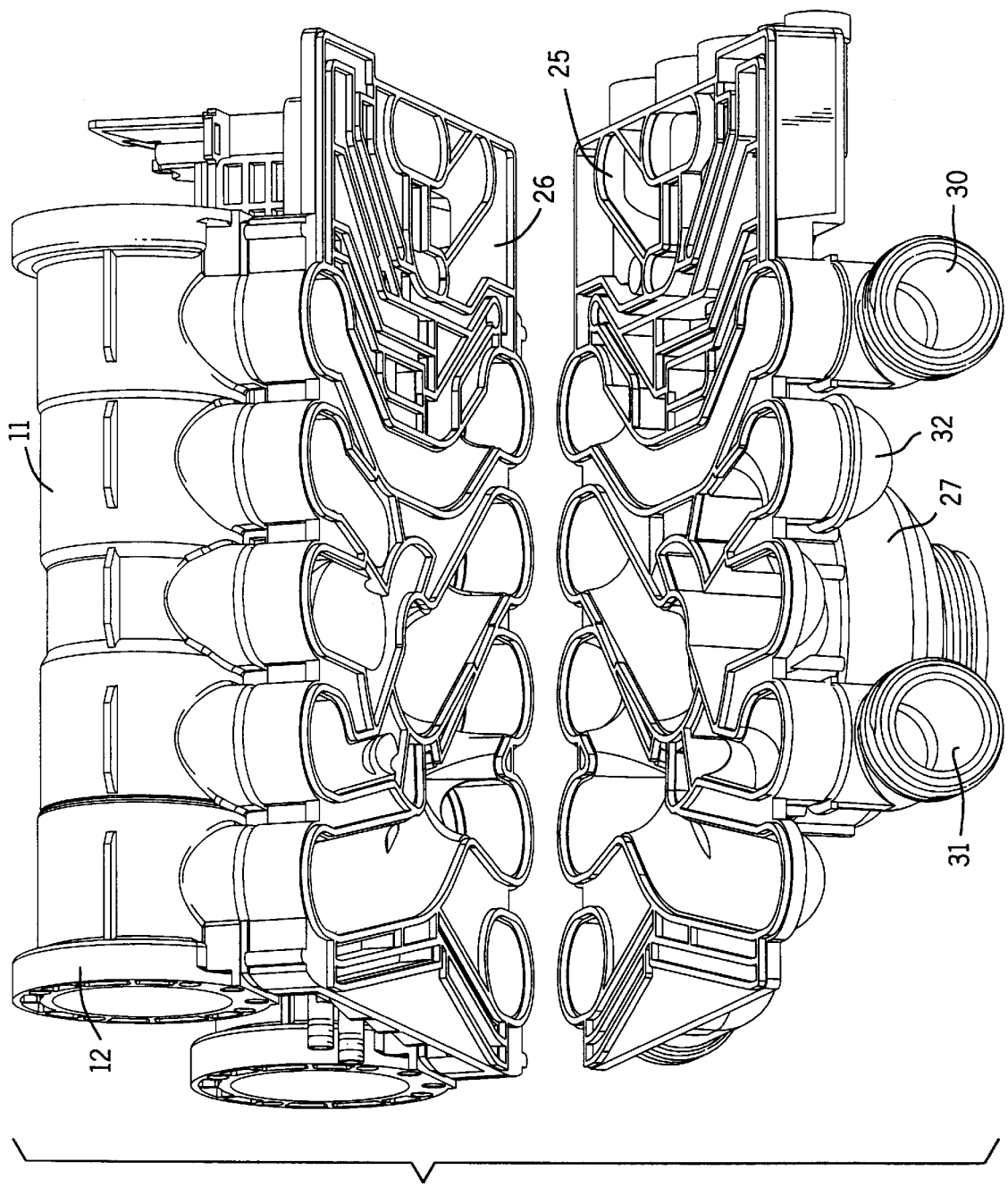
FIG. 4 is an exploded view in perspective through the manifold of the control valve.

As shown in FIG. 4, the manifold 10 is formed of a bottom half 25 and a top half 26 which are joined together to define passageways and openings for external connections. As shown in FIG. 3, a tank adapter 27 is attached to the bottom half 25 of the manifold 10 to connect certain of the manifold passages to a tank (not shown) containing a filter media, an ion exchange resin, or some other treatment bed. The bottom half 25 of the manifold 10 includes a fitting 28 for connection to a brine tank (not shown). A series of elbows 29, 30, and 31 connect passages in the manifold 10 to an outlet or service line, a drain, and an inlet for water to be treated, respectively. A plug 32 may cover an unused opening in the manifold 10.

The valve bodies 11 and 12 are open at both ends and receive poppet valve assemblies such as the assemblies 16, 17, and 18 or end caps 19. The valve bodies 11 and 12 have a series of ports along their length which connect with corresponding openings in the top half 25 of the manifold 10.

The two halves 25 and 26 of the manifold 10, the valve bodies 11 and 12, the elbows 29, 30, and 31, the plugs 32, and the tank adapter 27 are preferably all formed of a filled synthetic resin formed by molding and joined together at mating surfaces by sonic or solvent welding.

Figure 5:
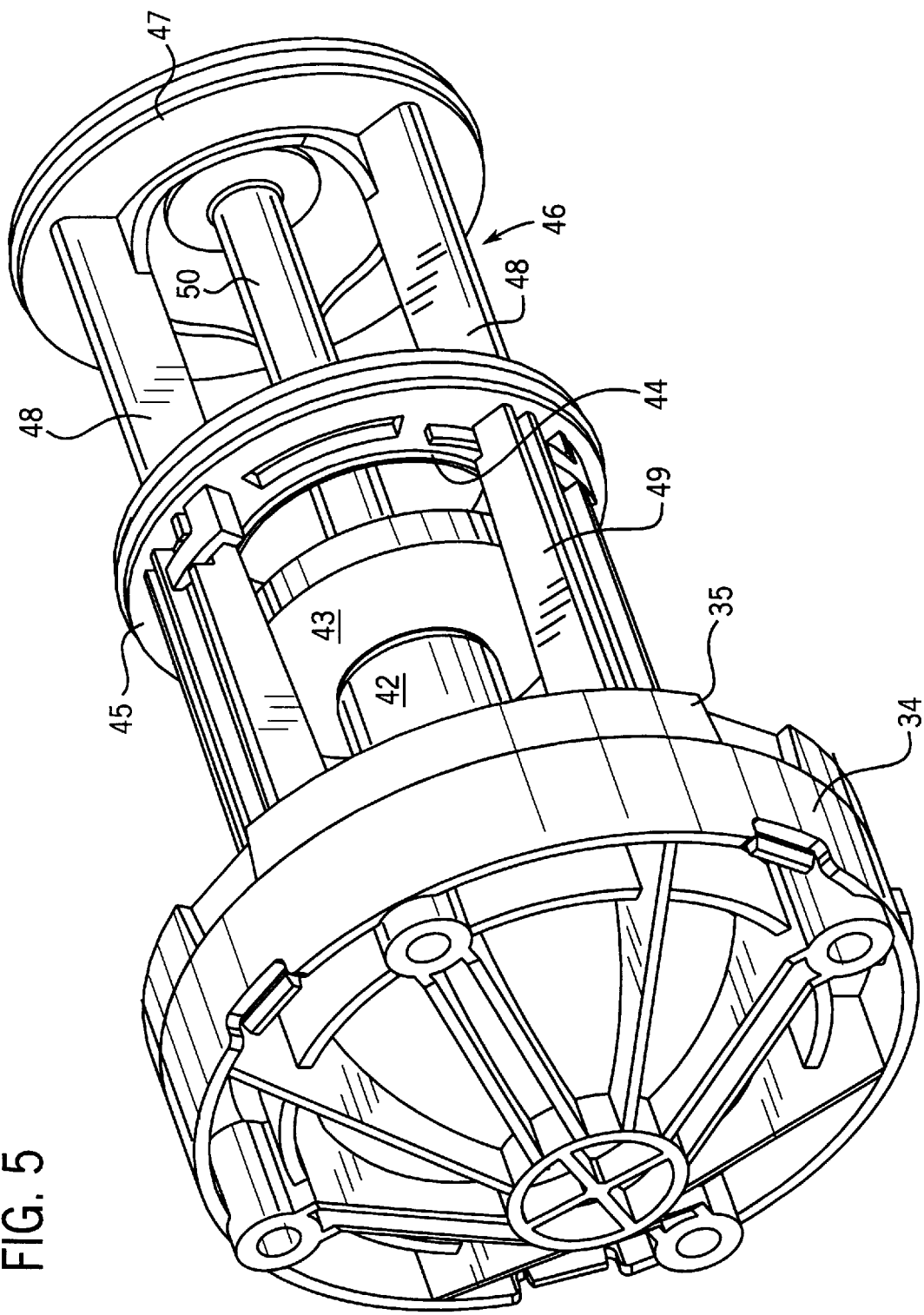
FIG. 5 is a view in perspective of a double poppet valve assembly for use in the control valve.
Figure 6:
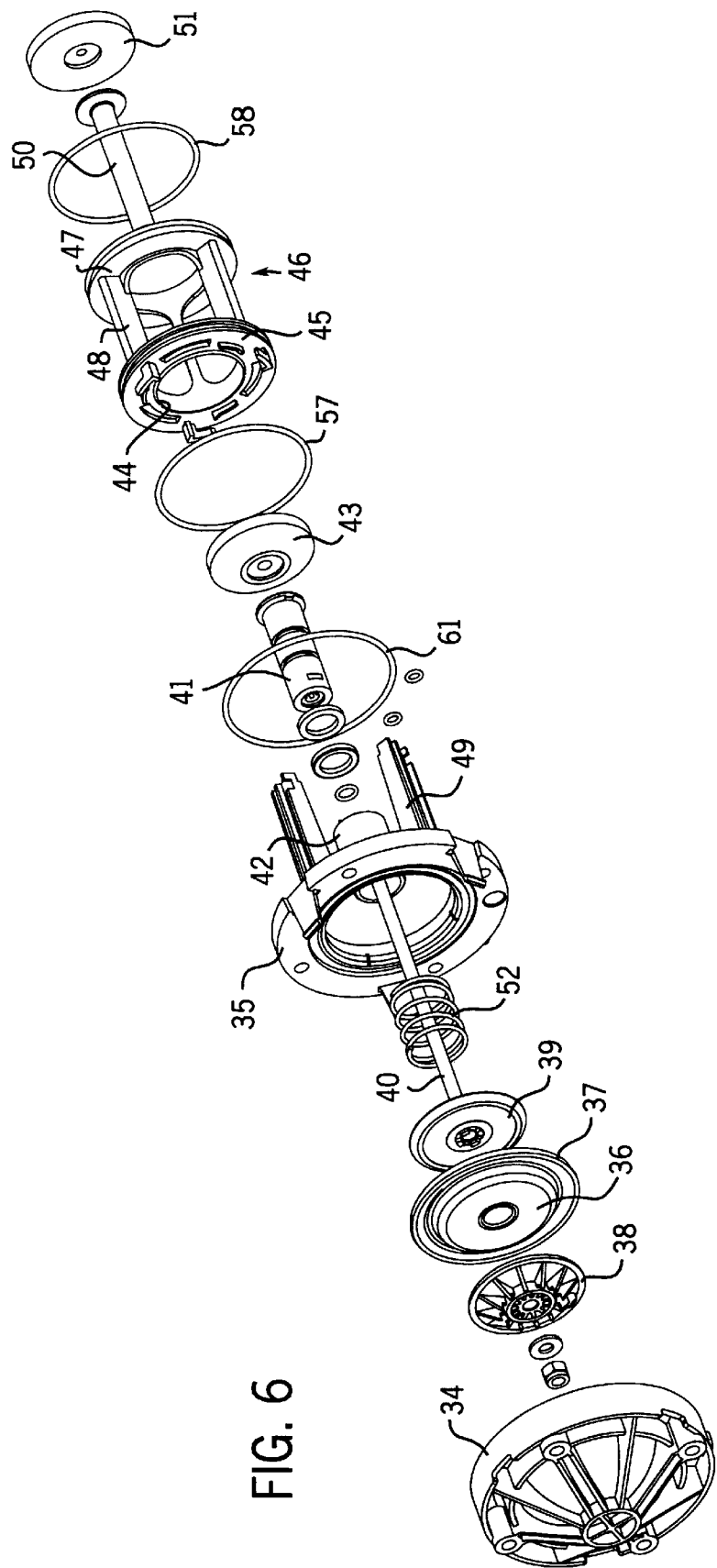
FIG. 6 is an exploded view in perspective of the double poppet valve assembly of FIG. 5.

Poppet valve assemblies may include single or double face seal poppet valves. A double face seal poppet valve is shown in perspective view in FIG. 5 and in an exploded perspective view in FIG. 6. The double face seal poppet valve assembly is shown in place in an open end of a valve body 11 in FIG. 7. Referring to FIGS. 5 and 6, the double face seal poppet valve assembly is formed of an outer chamber housing 34, which snaps in place with an inner chamber housing 35. A flexible diaphragm 36 has a peripheral rim 37 that is trapped between the outer and inner housings 34 and 35 and a generally hemispherical chamber is thereby formed on each side of the diaphragm 36. Piston halves 38 and 39 are mounted on opposite sides of the diaphragm 36 and are connected to a piston rod 40 which in turn is connected to a poppet actuator shaft 41. The inner chamber housing 35 includes a hollow stem 42 extending longitudinally away from the chamber. The actuator shaft 41 is received in the hollow stem 42 and sealed thereto by suitable O-rings or quad rings.

A first poppet valve 43 is connected to the actuator shaft 41. The first poppet valve 43 is adapted to seat against a valve seat 44 formed in the face of a ring 45 that forms one end of a poppet cage 46. The other end of the poppet cage 46 is formed by a second ring 47 which is spaced from the first ring 45 by integral arms 48. The poppet cage 46 is connected to legs 49 that extend longitudinally from the inner chamber housing 35. The piston shaft 40 extends through the cage 46. A sleeve 50 extends from the working side of the first poppet valve 43 and is disposed about the piston shaft 40. A second poppet valve 51 is mounted on the end of the piston shaft 40 and against the end of the sleeve 50. The second poppet valve 51 is adapted to seat against a valve seat 52 formed in the face of the second ring 47 of the cage 46. A return spring 52 may be employed between the piston half 39 and the valve stem 42 to urge the diaphragm 36 towards the outer chamber housing 34.

Figure 7:
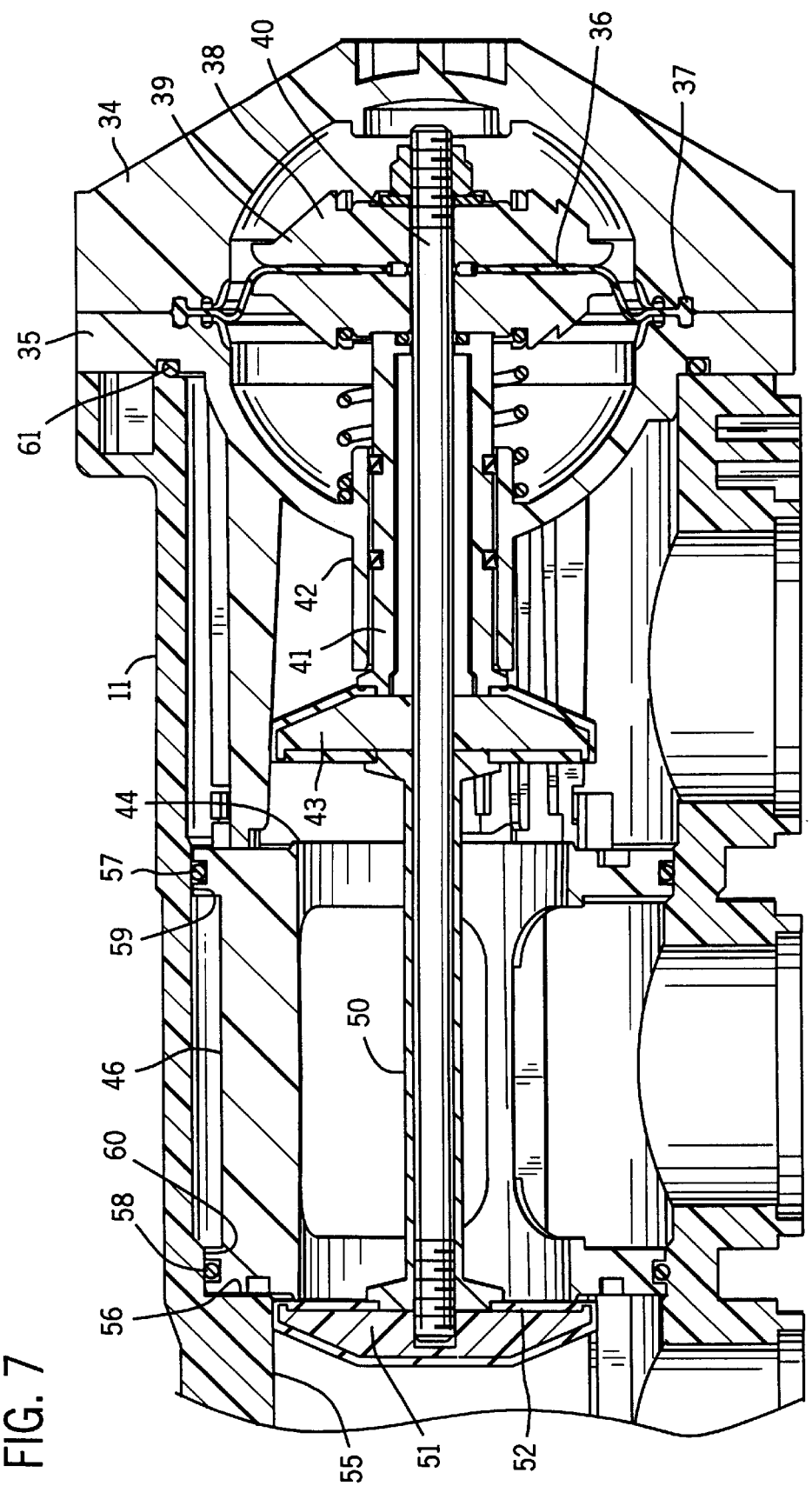
FIG. 7 is a view in vertical cross-section through one end of a cylindrical valve body with a double poppet valve assembly in place therein.

As shown in FIG. 7, the valve bodies 11 and 12 are formed with a series of concentric, stepped-down bores leading to a reduced diameter portion 55 which defines an end wall 56. The rings 45 and 47 of the cage 46 have peripheral grooves which mount O-rings 57 and 58 which seal with the bores 59 and 60, respectively. An O-ring 61 mounted in the face of the inner housing 35 seals against the end face of the valve body 11. The poppet assemblies are held in place by bolts 62 that extend through openings in the outer and inner housings 34 and 35 and are received in threaded plugs inserted into the end of the valve body 11. As shown in FIG. 7, the rings 45 and 47 divide the length of the valve body 11 into two sections between ports in the valve body 11.

Figure 8:
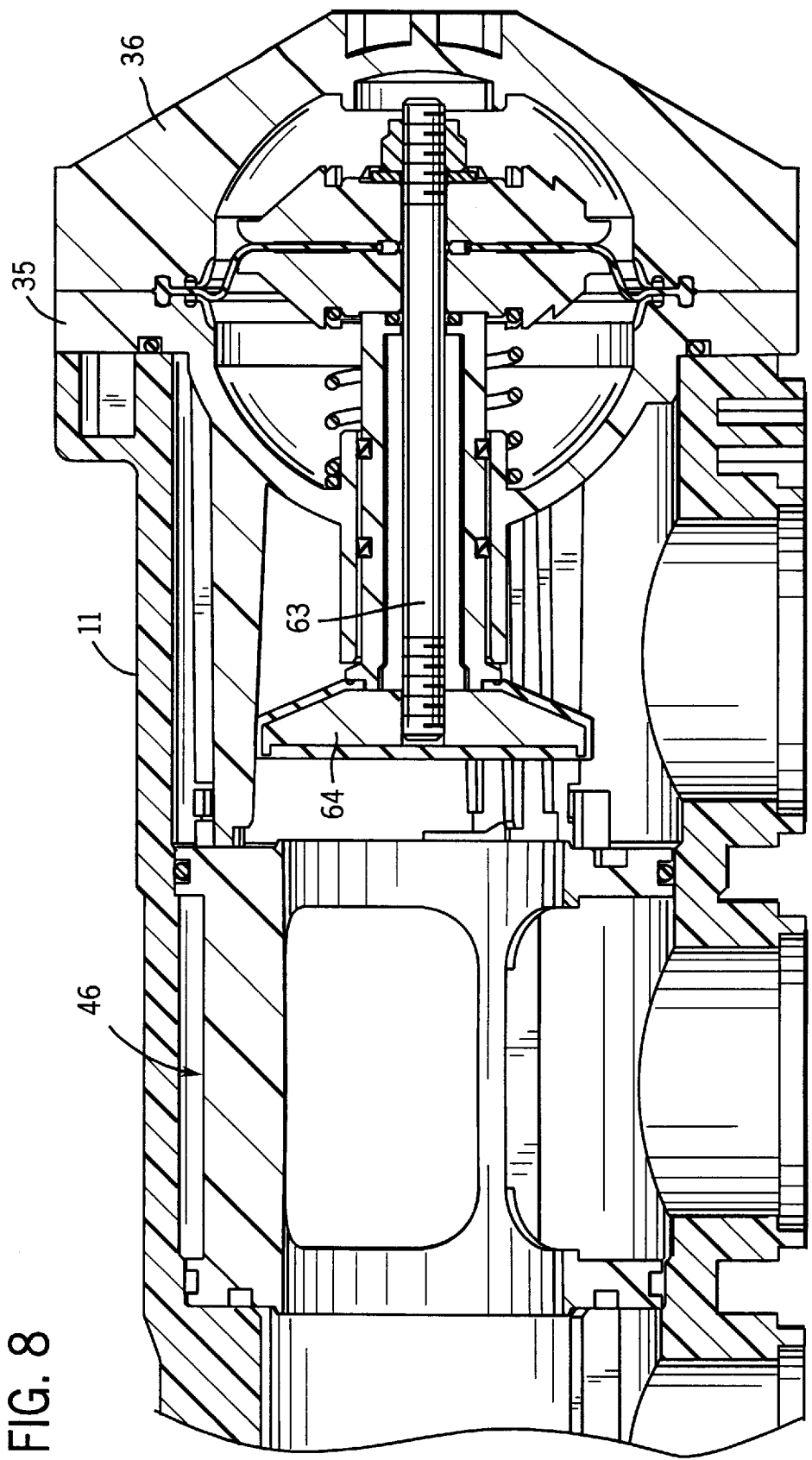
FIG. 8 is a view similar to FIG. 7 but showing a single poppet valve assembly in place in the valve body.
Figure 9:
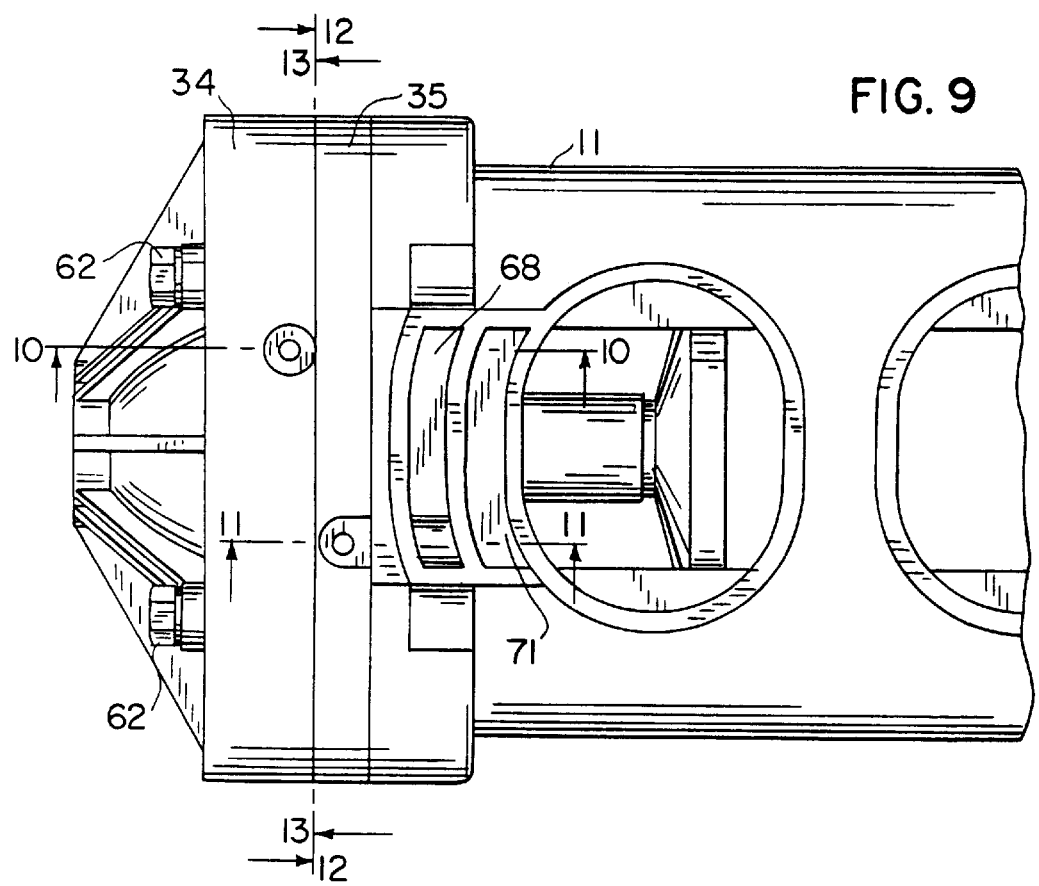
FIG. 9 is a bottom plan view of one end of a valve body with a single poppet valve installed therein.
Figure 10:
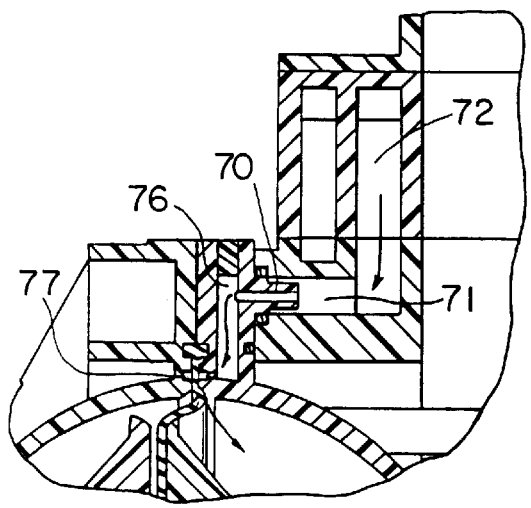
FIG. 10 is a partial view in section taken in the plane of the line 10—10 in FIG. 9.
Figure 11:
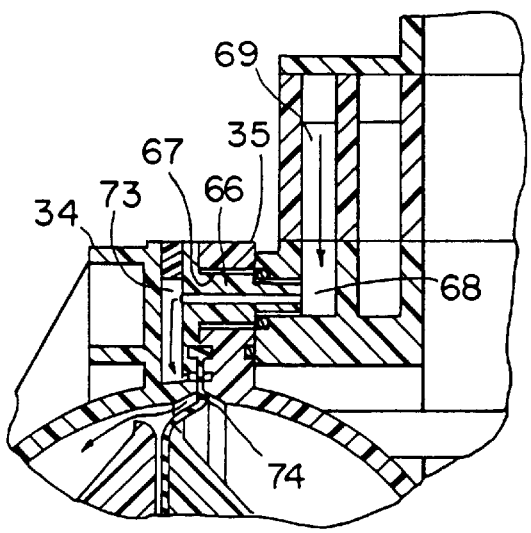
FIG. 11 is a partial view in section taken in the plane of the line 11—11 in FIG. 9.
Figure 15:
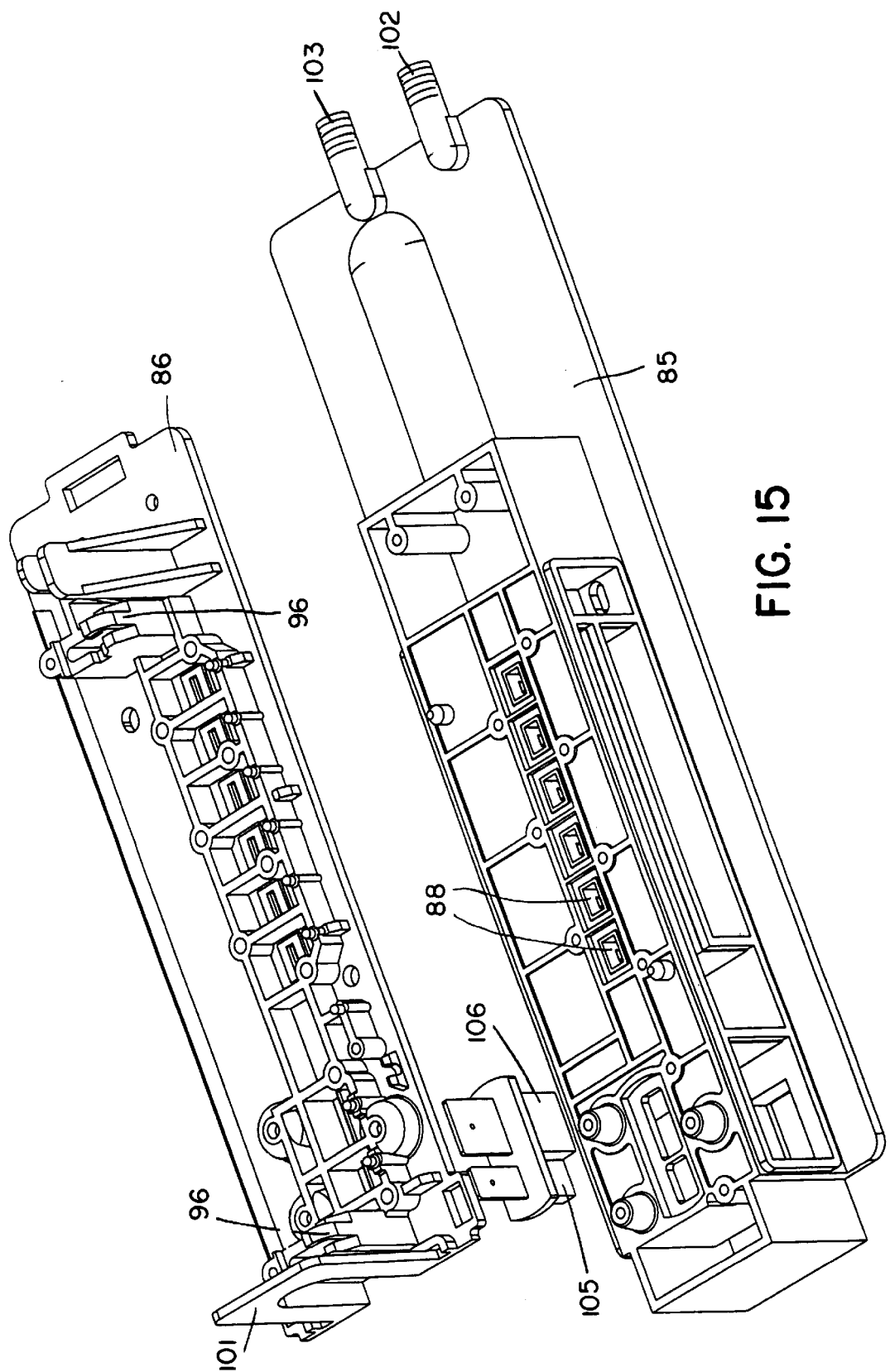
FIG. 15 is an exploded view in elevation of a flapper valve assembly of the control valve.

FIG. 8 illustrates a single face seal poppet valve assembly installed in a valve body 11 or 12. It differs from the double face seal poppet valve assembly by having a shorter piston rod 63 that ends at a first poppet valve 64 rather than extending through the cage 46. It is also not necessary to seal the second ring 47 of the cage 46 with the bore 57 when using the single face seal poppet valve.

Referring to FIGS. 9 through 14, the outer chamber housing 34 has a longitudinally extending pilot port 66 which projects through an opening 67 in the inner chamber housing 35 and seals with the end of the valve body 11 or 12. The valve body 11, 12 has a first pilot passageway 68 which aligns with a pilot passage 69 formed in the manifold assembly 10. The inner housing 35 also has a pilot port 70 that seals with the valve body 11, 12 and communicates with a second pilot passageway 71 in the valve body 11, 12. The second pilot passageway 71 aligns with a pilot passage 72 in the manifold assembly 10. A transverse opening 73 is formed in the outer housing 34 in communication with the rear of the first pilot port 67. The opening 73 is plugged and leads to an orifice 74 which extends into a circular recess 75 that encircles the chamber defined by the outer housing 34. The circular recess 75 is radially inward of the rim 37 of the diaphragm so that fluid can flow through the pilot port 67, the transverse opening 73, the orifice 74, and the recess 75 to and from the side of the chamber defined by the outer housing 34. The inner chamber housing 35 has a similar transverse opening 76 that is plugged and communicates with the rear of the second pilot port 70 and which leads to an orifice 77 communicating with a circular recess 78 in the chamber formed by the inner housing 35. Pilot fluid under pressure is fed to and exhausted from the chambers through the pilot ports 66 and 70 and the orifices 74 and 77 to pressurize one or the other of the chambers on either side of the diaphragm 36.

The control valve is adaptable to be mounted horizontally on the top of a vertical treatment tank or on its side in side mount applications. To allow for the evacuation of air from a chamber regardless of the orientation of the control valve, four radial passages 80 are formed at the four quadrants of the chamber in the outer housing 34. The radial passages 80 lead from the chamber to the circular recess 75. Similar radial passages 81 are formed in the four quadrants of the chamber in the inner housing 35 to connect the chamber with the circular recess 78. As a chamber on one side of the diaphragm 36 fills with pilot fluid, any air in that chamber above the level of the fluid will be forced through one of the radial passages 80 or 81 and out a respective port 67 or 70 to a drain connection for the pilot valve array.

Referring to FIGS. 15 through 20, the flapper valve assembly 13 is formed of a valve housing 85 mounted on the top half 26 of the manifold assembly 10 and a cover 86 mounted on top of the valve housing 85. A plurality of pilot flapper valves having valve stems 87 are mounted in valve openings 88. The valve openings 88 contain ports 82 and 83 that connect to pilot passages in the manifold assembly 10 that lead to the pilot passages 68 and 72 at each end of the two valve bodies 11 and 12. In the embodiment shown, there are six pilot flapper valves. The flapper valves are actuated by the cam shaft 14 which mounts a plurality of cams 90A, 90B, etc. The cams 90A, 90B, etc. have lobes that engage the stems 87 of the flapper valves in a controlled sequence to open and close the pilot valves, in a known manner.

Figure 16A:
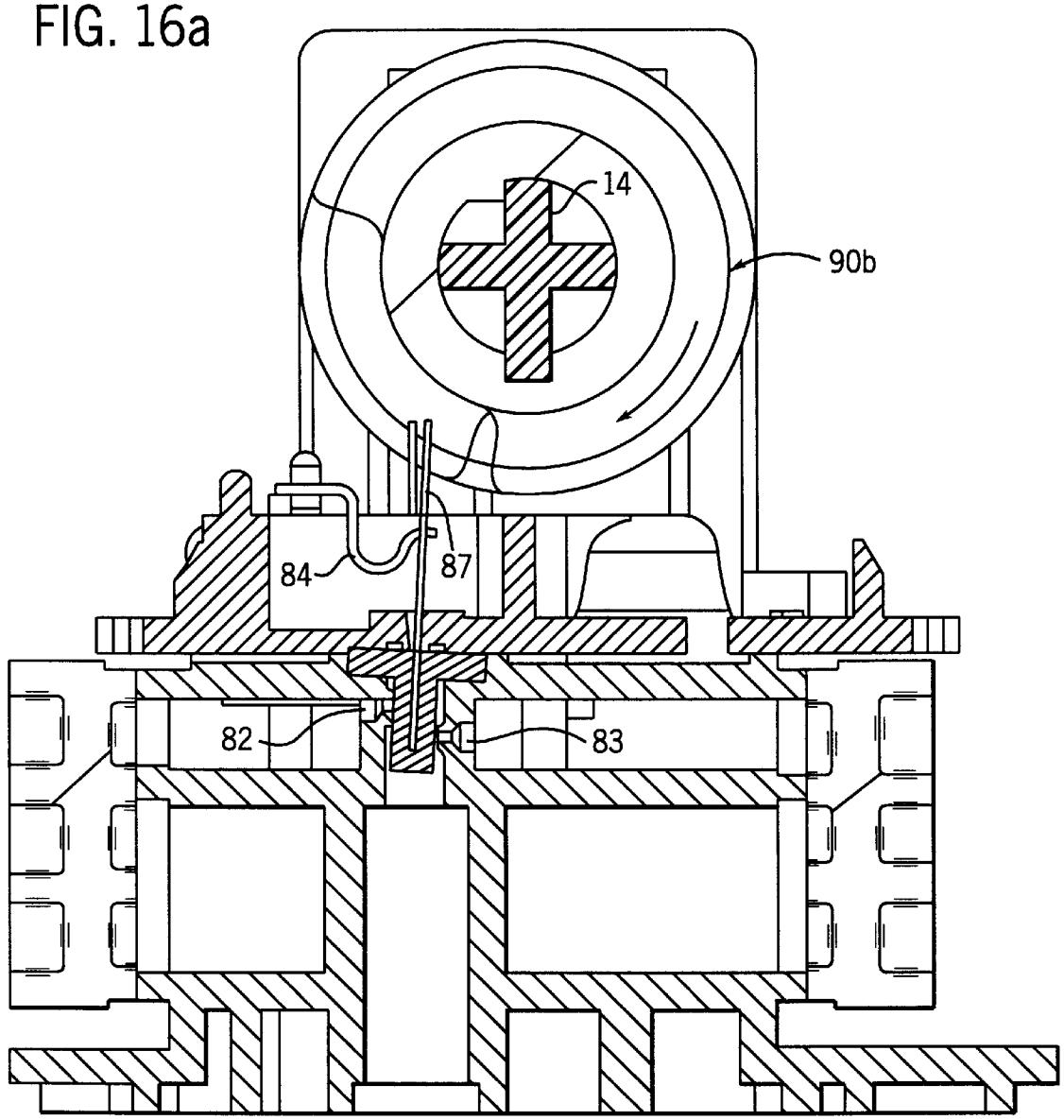
FIG. 16a is a view in vertical section taken in the plane of the line 16a—16a in FIG. 16.
Figure 21:
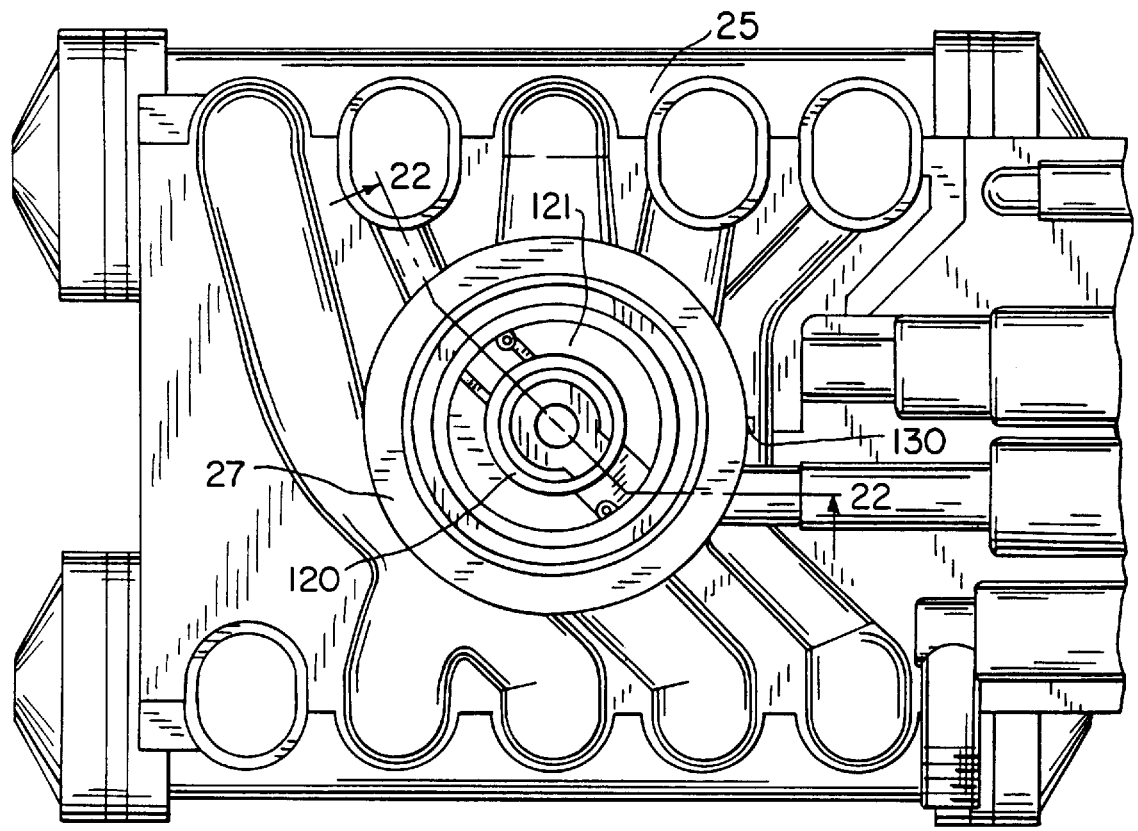
FIG. 21 is a bottom plan view of the manifold and tank adapter.
Figure 22:
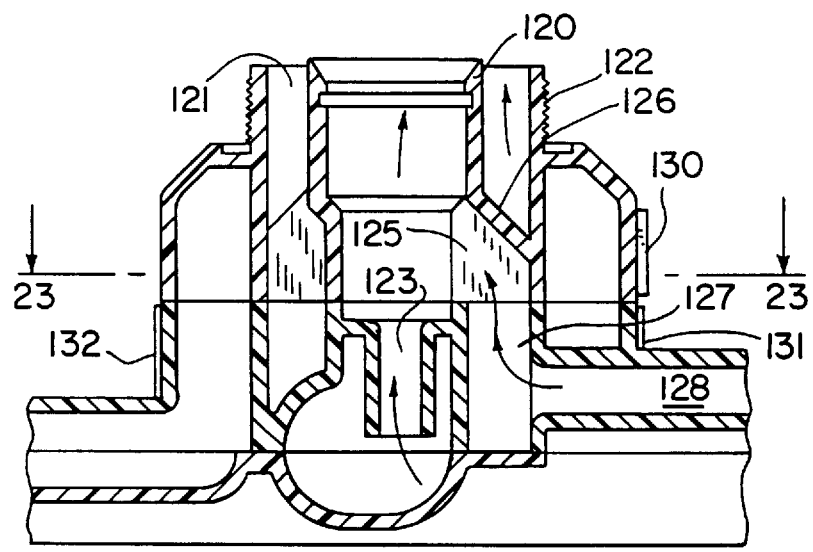
FIG. 22 is a view in section taken in the plane of the line 22—22 in FIG. 21.
Figure 23:
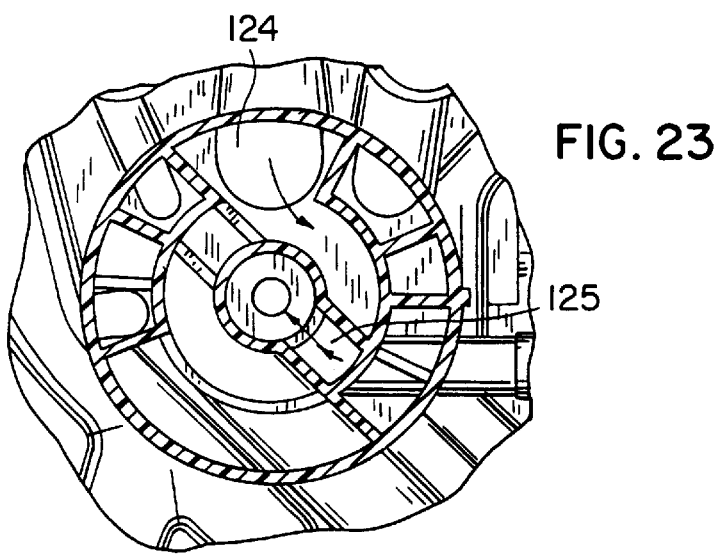
FIG. 23 is a view in section taken in the plane of the line 23—23 in FIG. 22.

The pilot flapper valve is spring-loaded by a spring 84 in one direction to close off one port 82. When actuated by the camshaft, the flapper valve is moved across the opening 88 and contacts the port 83 on the opposite side and closes off that port. To allow for overtravel of the cams, the flapper stem 87 is itself a spring rather than a rigid metal part. As shown in FIG. 16a, cam rotation (clockwise) would move the flapper to the port 83 on the right. The ports 82 and 83 are slightly offset.

The cam shaft 14 has a clutch end 91 that engages in a clutch socket 92 in a drive shaft 93 of the timer assembly 15. The cam shaft 14 is journaled in bearings 94 and 95 mounted in stanchions 96 on opposite ends of the e cover 86. One bearing 95 includes a longitudinal slot 97 through which a longitudinal fin 98 of the cam shaft 14 can pass when the fin is aligned with the slot. When the fin is not aligned with the slot, a flange 99 on the cam shaft will engage with the wall 100 of the stanchion to prevent axial withdrawal of the cam shaft 14. The cam shaft 14 can be manually withdrawn to remove the clutch end 91 from the clutch socket 92 if the c am shaft 14 is in a neutral position in which no flapper valves are actuated. The neutral position is indicated by the fin 98 being in alignment with the slot 97 in the bearing 95. As shown in FIG. 20, withdrawal of the cam shaft 14 allows the timer assembly 15 to be removed from its mounting on a wall 101 extending from the cover 86, as will be described in fuller detail hereafter.

The flapper valve housing 85 includes a pilot drain fitting 102 and an auxiliary pilot output fitting 103. The valve housing 85 and cover 86 are formed of the same material as that of the manifold 10 and are welded together and to the manifold 10.

The pilot valve assembly 13 also includes flapper valves for controlling the flow to and from a brine tank (not shown). First and second brine valves 105 and 106 are used for that purpose. The first brine valve 105 operates against a relatively small port 107 and opens against pressure. The stem 108 of the first brine valve 105 is controlled by a cam 109. The second brine valve 106 works against a much larger port 110 and also opens against pressure. The stem 111 of the second brine valve 106 is engaged by a cam 112. As shown in FIGS. 17 through 19, the cam 109 engages the stem 108 of the first brine valve 105 before the cam 112 engages the stem 111 of the second, larger brine valve 106. The result is that the smaller first brine valve 105 will open before the larger valve opens thereby tending to equalize the pressure on both sides of the ports 107 and 110 and making it easier to open the larger brine valve 106 against pressure.

Figure 24:
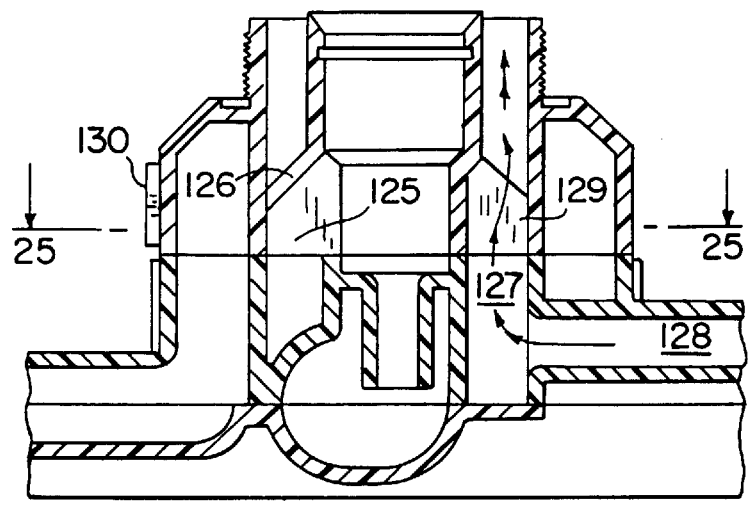
FIG. 24 is a view similar to FIG. 22 but showing the coupling in an alternate position.
Figure 25:
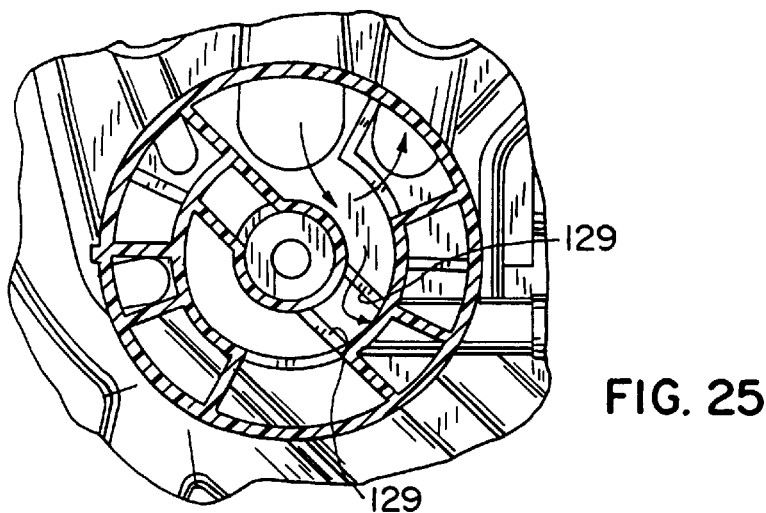
FIG. 25 is a view in section taken in the plane of the line 25—25 in FIG. 24.

Referring to FIGS. 21 through 25, the tank adapter 27 can convert the control valve between countercurrent and co-current flow of the regeneration fluid relative to the water to be treated. The tank adapter 27 includes a central pipe portion 120 for attachment to the central tube extending down through a treatment bed. An annular space 121 surrounds the central pipe portion 120 for communication to the top of the bed. Threads 122 surround the tank adapter 27 for attachment to the top of the tank holding the bed. The central pipe portion 120 communicates with a central passageway 123 for flow to a drain. In the position of the tank adapter 27 shown in FIGS. 22 and 23, an untreated water inlet 124 communicates with the annular space 121 so that untreated fluid is deposited on the top of the bed. The tank adapter 27 has a passageway 125 with a sloping roof 126. The passageway 125 leads through a side opening in the central pipe portion 120 of the tank adapter 27. The passageway 125 can be aligned with a brine opening 127 connected to the educator passage 128. In the position shown in FIGS. 22 and 23, brine (indicated by a line with a double arrowhead) will pass into the central pipe portion 120 of the tank adapter 27 and down the central tube towards the bottom of the bed. In this arrangement, the flow of brine or other regenerative fluid is countercurrent to the flow of the water or other fluid to be treated. In FIGS. 24 and 25, the tank adapter 27 has been rotated 180° so that the passageway 125 is out of communication with the brine opening 127. As a result, brine will pass through a space between walls 129 to the annular area 121 outside the central pipe portion 120 towards the top of the bed. This is the same direction as the flow of water to be treated, and the tank adapter 27 has, therefore, defined co-current flow. A raised indicator 130 on the perimeter of the coupling is aligned with indicator arrows 131 and 132 to define the proper alignment of the coupling in each of its two operative positions.

The control valve is adapted to mounting on the top of vertical upright tanks or on the side of the tank in side mount applications. Since the timer assembly 15 typically contains settings and indicators that are manually manipulatable and readable, it is desirable that the timer assembly 15 be always mounted in an upright position. To this end, an array of mounting brackets are provided to mount the rear of the timer assembly 15 to the wall 101 at the end of the cover 86 for the flapper valve assembly. The mounting brackets are shown in FIGS. 26 through 30. The brackets include a pair of spaced top brackets 140 and 141 having front flange portions spaced from the rear surface 142 of the timer assembly 115. A pair of spaced angle brackets 143 and 144 also have flanges that extend away from the back wall 142 a similar distance. The angle brackets 143 and 144 connect to the back wall 142 by L-shaped portions. As shown in FIG. 26, when the timer assembly 15 is mounted to the wall 101 in a normal orientation, the wall 101 is received between the angle brackets 143 and 144 and beneath the flanges of the upper brackets 140 and 141. In this orientation, the top edge of the wall 101 supports the upper brackets 140 and 141 and a pair of shelves 145 extending from either side of the wall 101 engaging the L-shaped portions of the angle brackets 143 and 144. To orient the timer assembly 15 ninety degrees (90°) in either direction from normal, as shown in FIG. 27, the wall 101 is received between the top brackets 140 and 141 on one side and the angle brackets 143 and 144 on the other side. The shelves 145 rest against the closest top bracket 140 or 141 on the one side and the closest angle bracket 143 or 144 on the other side.

Figure 31:
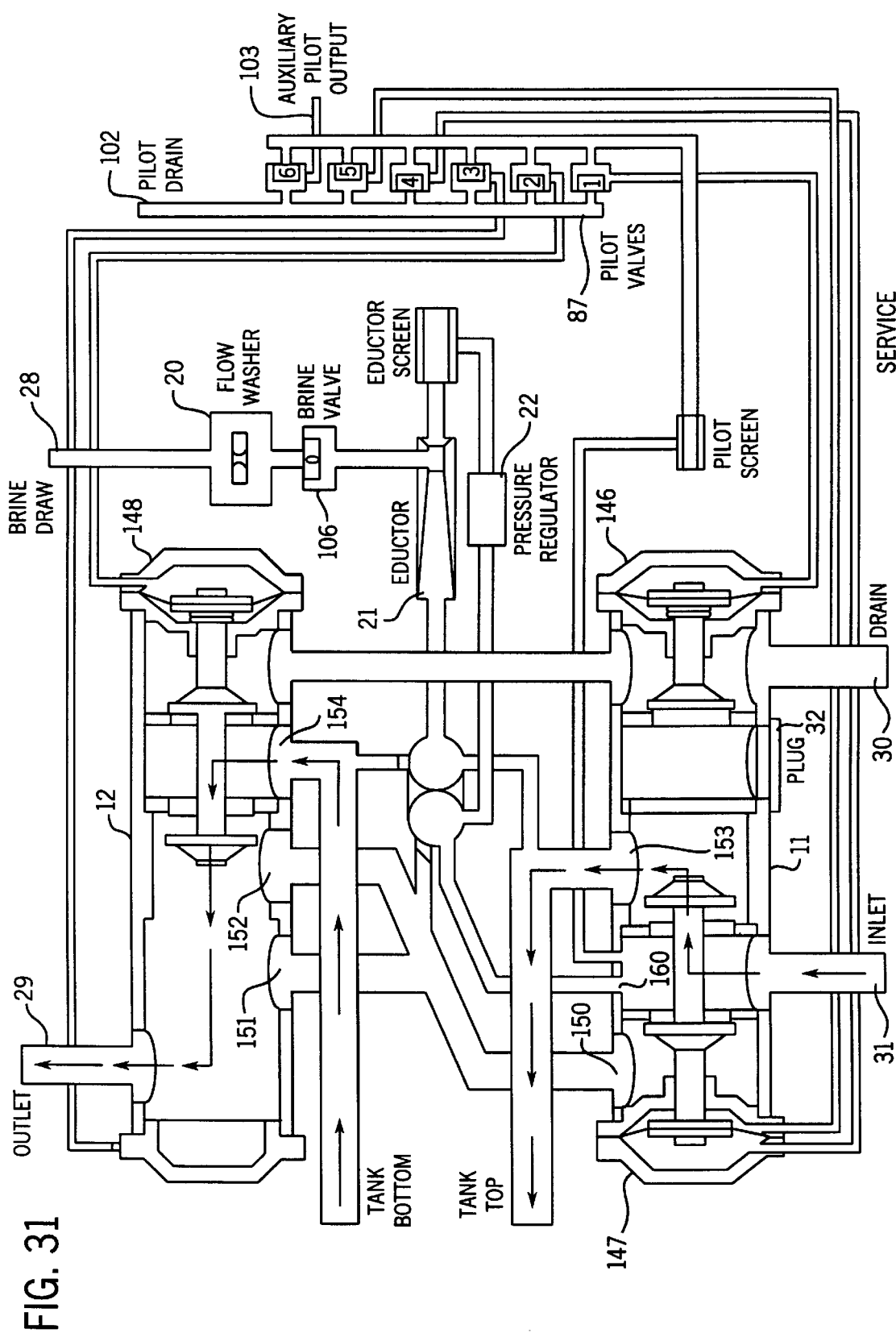
FIG. 31 is a diagrammatic view of the relationship of the pilot valves, poppet valves, and passageways during the service cycle when the control valve is configured for a five-cycle softener valve with hard water bypass and with the flow of regenerative fluid co-current with the flow of water to be treated.

The control valve can be configured for a variety of cycles of operation in a variety of modes of operation. FIGS. 31 through 35 illustrate diagrammatically the arrangement and operation of the control valve when configured for a five-cycle water softener system in which untreated water is bypassed to the service outlet and with the brining or regeneration occurring co-current with the flow of water to be treated. FIG. 31 shows the service cycle. The valve body 11 contains a first poppet valve assembly 146 which is a single face seal poppet valve actuated to a closed position by the pilot valve 1 and returned to an open position by a return spring. The poppet valve assembly 146 controls the flow to the drain 30 and will be referred to as a drain valve assembly.

The valve body 11 also mounts a second poppet valve assembly 147 which is a double face seal poppet valve which controls the flow of water through the inlet 31 and which will be referred to as an inlet valve assembly. The positions of the face seal poppet valves in the inlet valve assembly 147 are controlled by pilot valves 4 and 5 which are connected to the two sides of the diaphragm chamber of the inlet valve assembly 147.

Another double face seal poppet valve assembly 148 is mounted in one of the open ends of the second valve body 12. This poppet valve assembly 135 controls the flow from and to the tank bottom and will be referred to as the tank bottom valve assembly. It is actuated to one position by pilot valve 2 and is actuated to its other position by a return spring.

During the service cycle illustrated in FIG. 31, the pilot valve 1 is opened so that piloting pressure actuates the drain valve assembly 146 to a position where its poppet closes. This prevents the flow of inlet water to the drain. At the same time, the pilot valve 4 is opened to force the poppets of the inlet valve assembly 147 to the right to close off the flow of water from the inlet to a port 150 in the valve body 11 which connects with ports 151 and 152 in the second valve body 12. Movement of the inlet valve assembly 147 under the influence of pilot valve 4 also opens the path of inlet water to a port 153 in the first valve body 11 that leads to the top of the tank. Thus, the inlet water can flow to the top of the tank and pass through the bed in the tank. Treated water is withdrawn from the tank bottom through a port 154 in the second valve body 12 and the flow of the treated water reaches the outlet 29 because the open pilot valve 2 actuates the tank bottom valve assembly 148 against the force of the return spring. This also closes the path to the drain 30.

Figure 32:
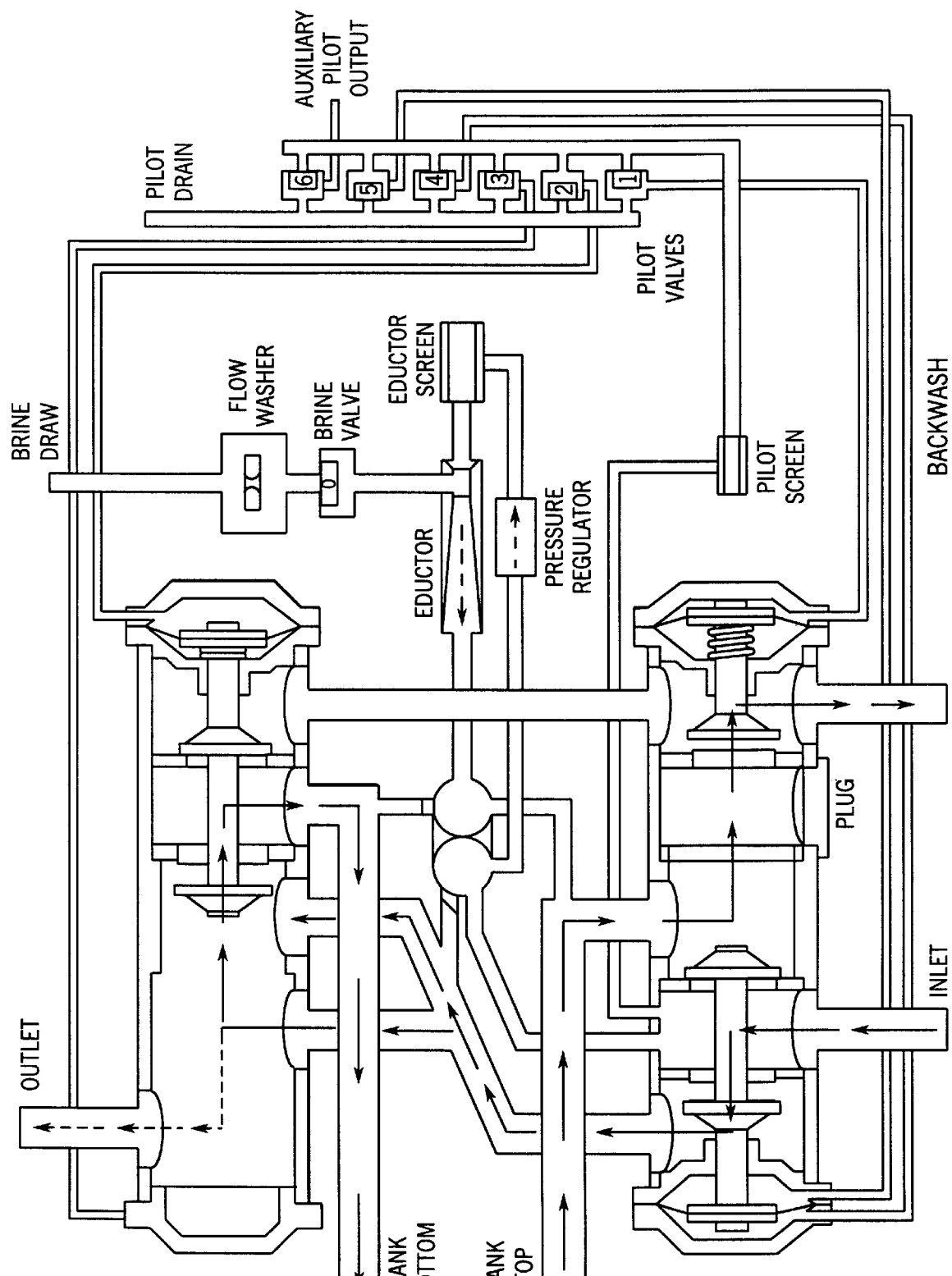
FIG. 32 is a view similar to FIG. 31 but showing the backwash cycle.

The backwash cycle is illustrated in FIG. 32. To initiate backwash, the pilot valve 1 is closed, thereby allowing the return spring in the drain valve assembly 146 to open the poppet valve and allow a flow of water from the top of the tank to the drain. The pilot valve 4 is closed and the pilot valve 5 is opened to cause the inlet valve assembly 147 to shift to the left as viewed in FIG. 32, thereby closing the port 153 to inlet water and opening the port 150 to inlet water. The inlet water flows through the port 150 to the second valve body 12, through the open poppet of the tank bottom valve assembly 148, and out the port 154 to the bottom of the tank. Thus, backwash water will flow upwardly through the resin bed in the tank and to the drain. At the same time, untreated water can flow through the outlet 29.

Figure 33:
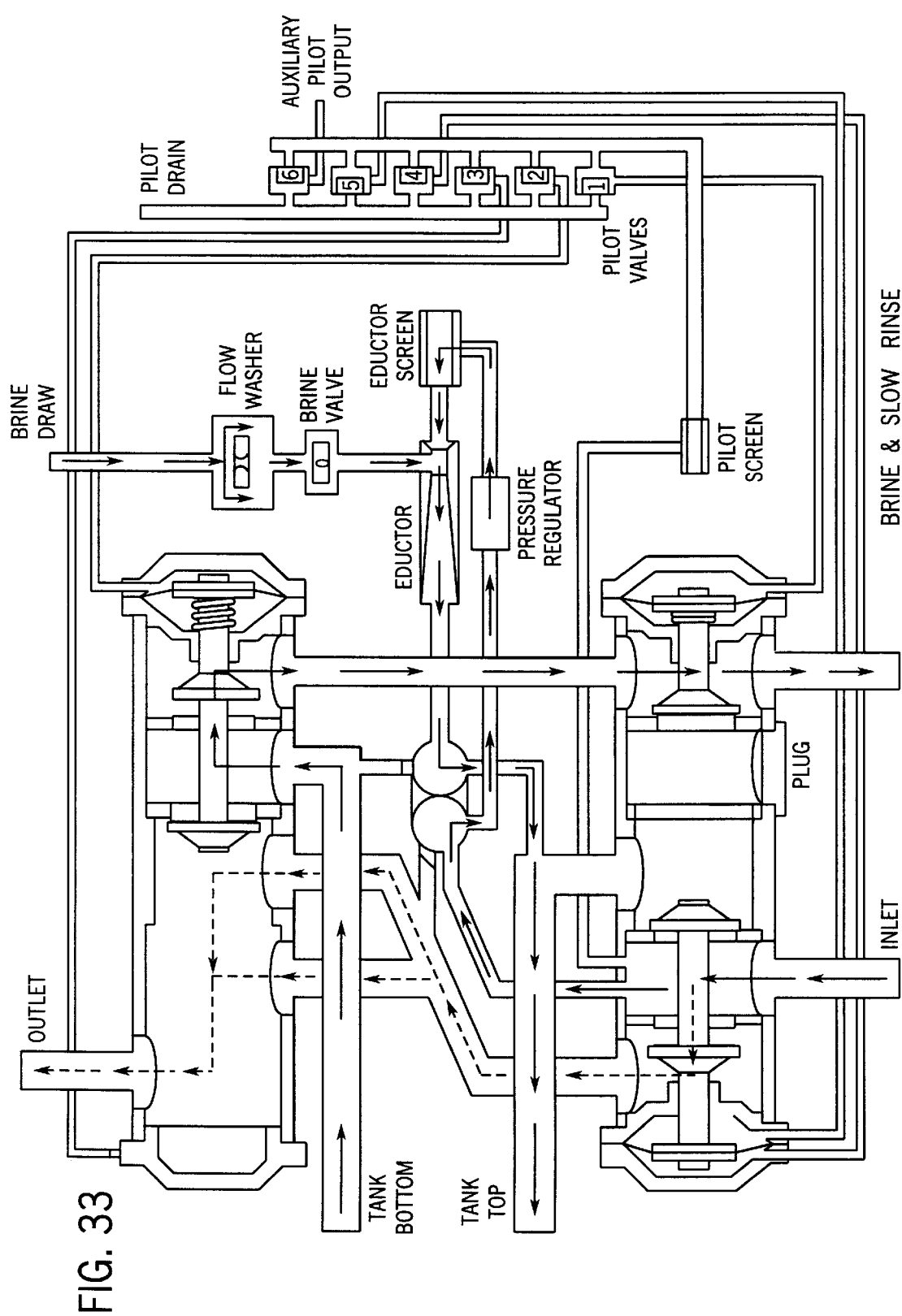
FIG. 33 is a view similar to FIG. 31 but showing the brine and slow rinse cycle.

Following backwash, the next cycle is brine and slow rinse. This cycle is illustrated in FIG. 33. To initiate this cycle, pilot valve 1 is again opened to close the drain valve assembly 146, the inlet valve assembly 147 remains in the same position as it was for backwash, but the tank bottom valve assembly 148 is actuated by the return spring following the closing of the pilot valve 2. The brine valves 105 and 106 are also opened. The result is that inlet water will flow through a port 160 in the valve body 11, through the pressure regulator 22 and an educator screen 161 to the eductor 21, thereby drawing brine through the open brine valve 106 to the top of the tank. Water that is forced from the tank bottom passes through the port 154 and the open poppet of the tank bottom valve assembly 148 to drain. At the same time, untreated water can flow to the outlet as shown by the dotted line arrows in FIG. 33.

Figure 34:
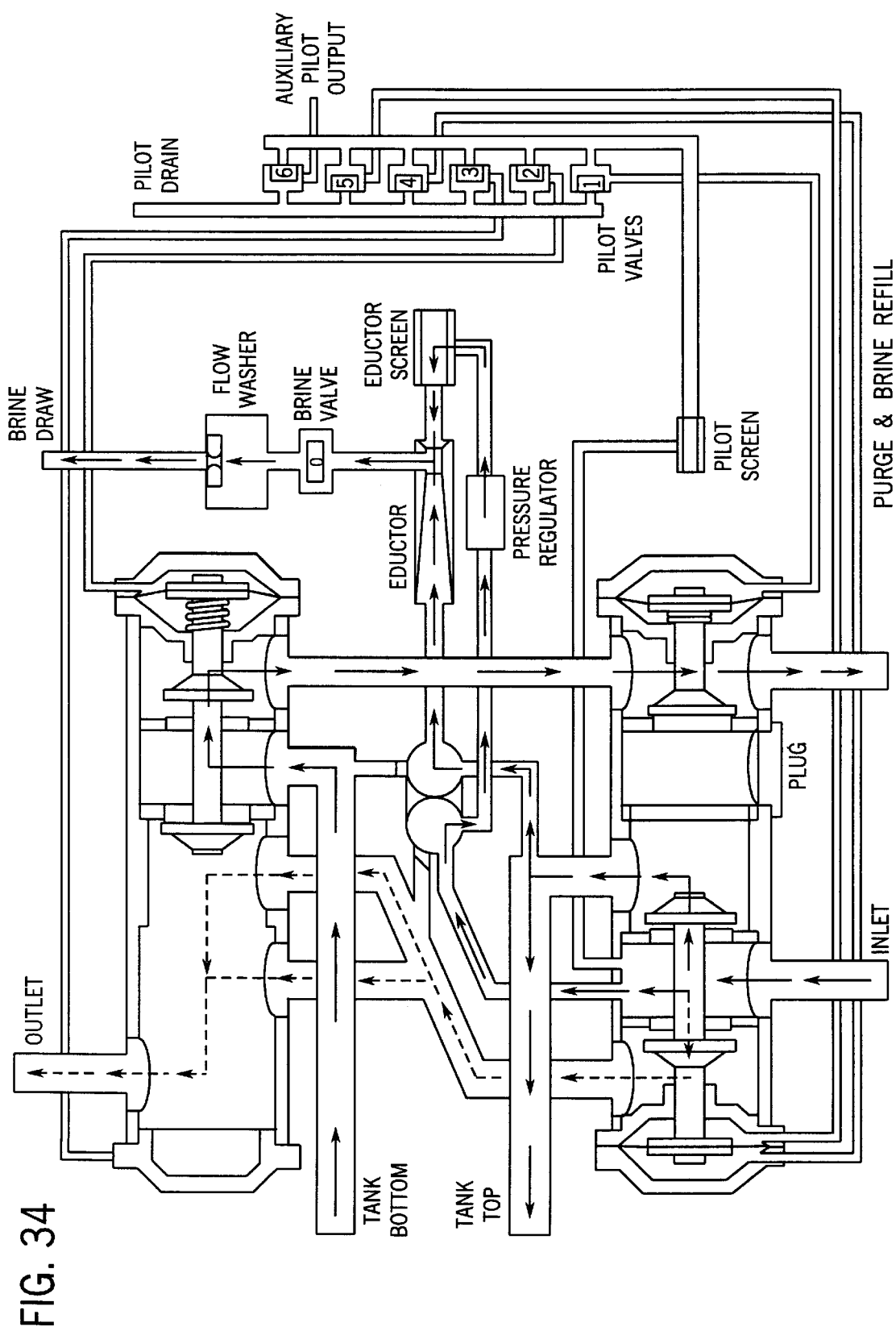
FIG. 34 is a view similar to FIG. 31 but showing the purge and brine refill cycle.
Figure 35:
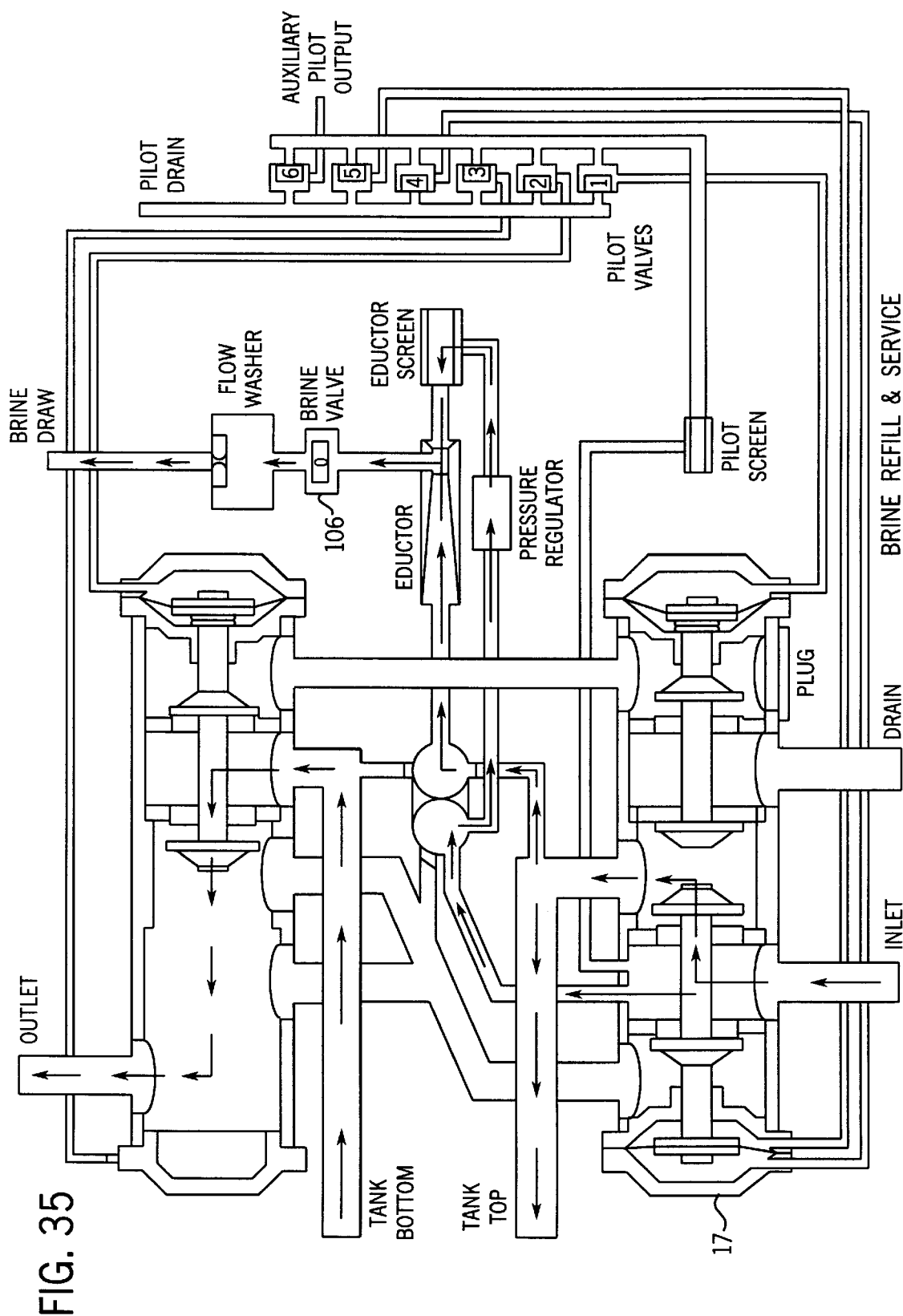
FIG. 35 is a view similar to FIG. 31 but showing the brine refill and service cycle.

In the fourth cycle of purge and brine refill illustrated in FIG. 34, the drain valve assembly 146 and the tank bottom valve assembly 148 are in the same positions as during the brine and slow rinse cycle. The brine valve 106 remains open. The only difference in the position of valves is that both of the pilot valves 4 and 5 are opened so that the inlet valve assembly 147 is balanced in a neutral position with both of its poppets open. The result is that untreated water can flow to the top of the tank and can flow to refill the brine tank by reverse flow through the eductor 21 and the brine valve 106. In the fifth cycle of brine refill and service shown in FIG. 35, the inlet valve assembly 147 is again shifted to the right by the opening of pilot valve 4 and the closing of pilot valve 5 so that water can flow in the normal service path. However, the brine valve 106 remains open so that water can also refill the brine tank.

Figure 36:
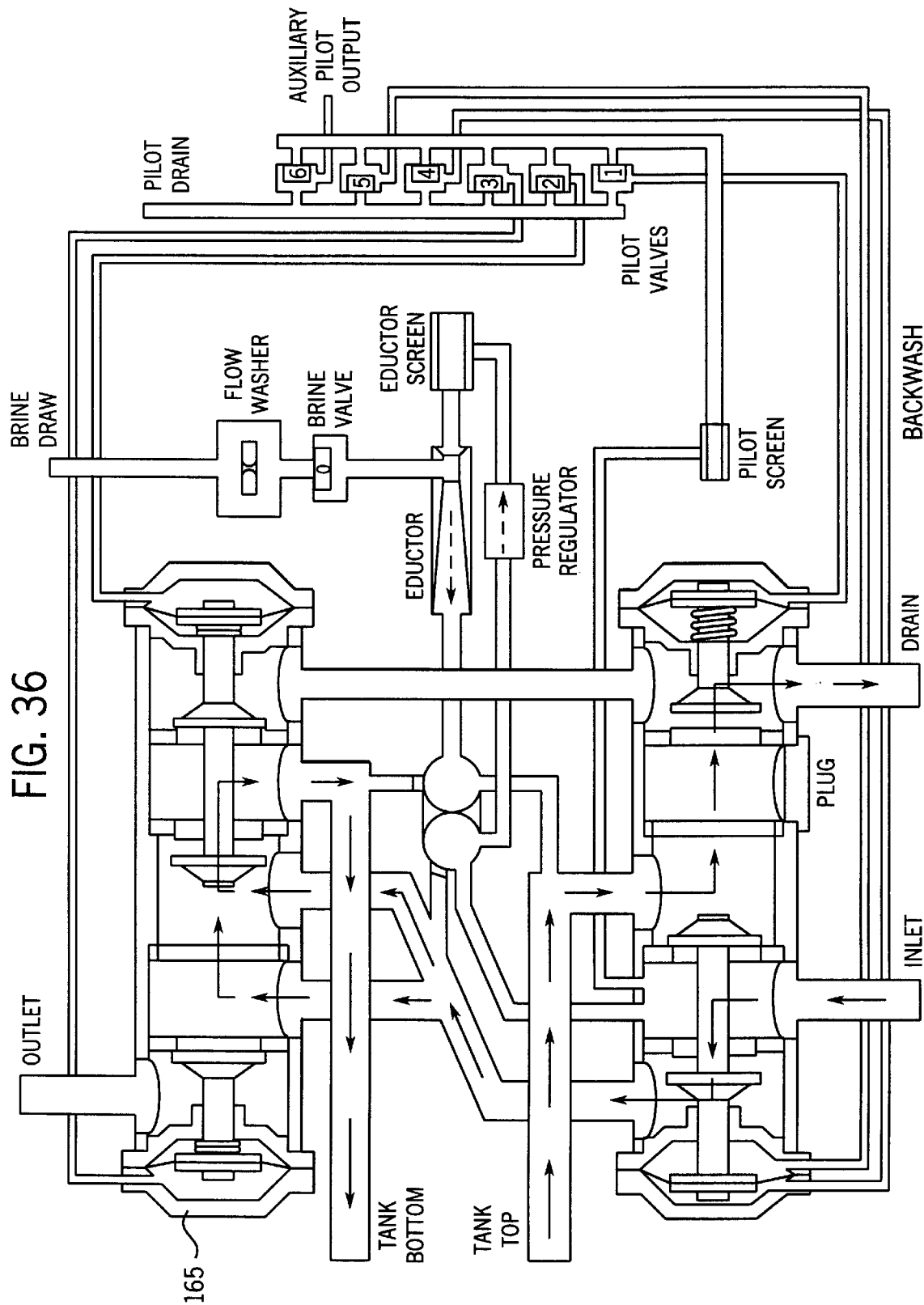
FIG. 36 is a diagrammatic view of the backwash cycle of the control valve configured for a five-cycle water softener system without hard water bypass and with co-current operation.
Figure 37:
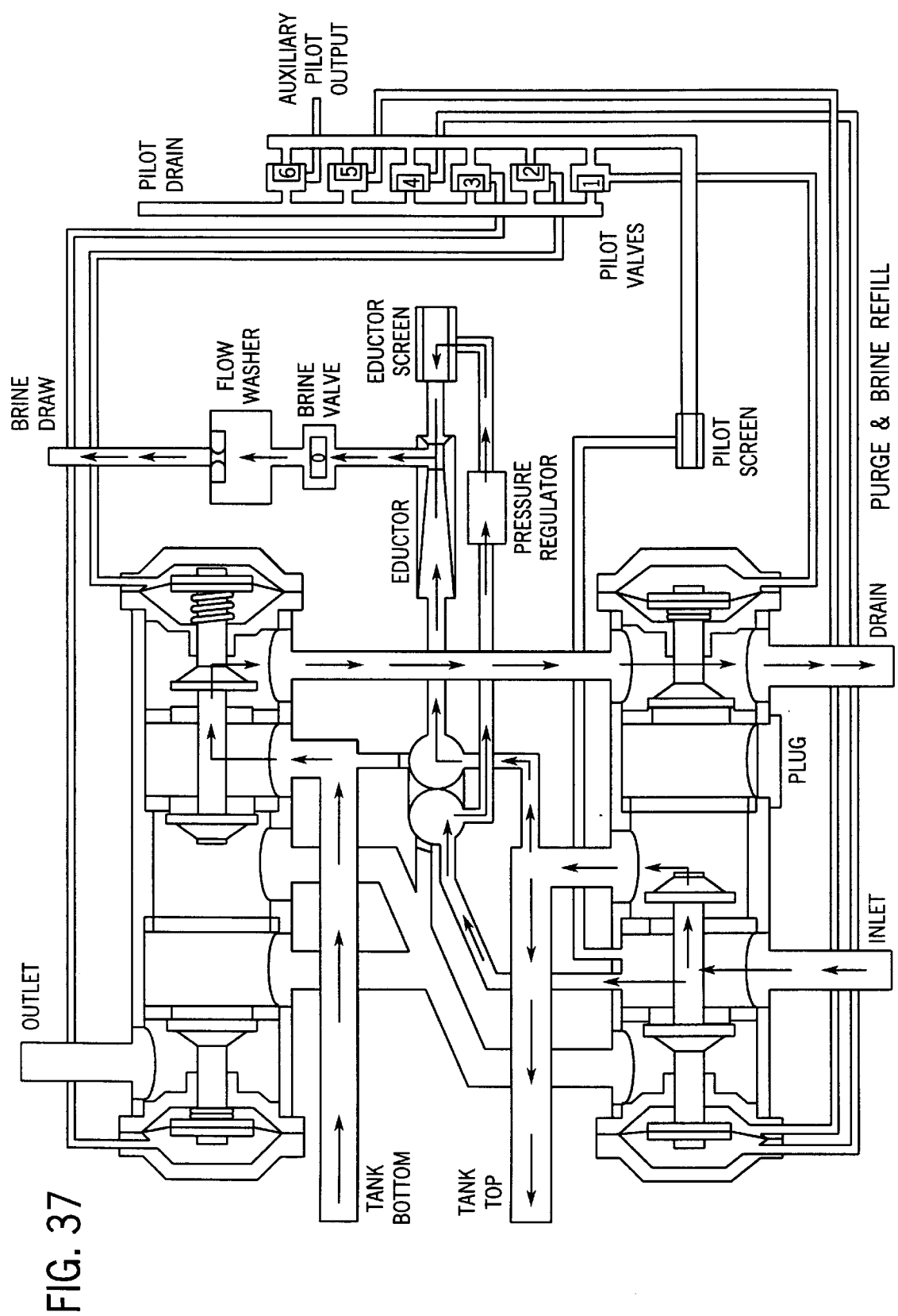
FIG. 37 is a diagrammatic view of the valve of FIG. 36 but showing the purge and brine refill cycle.

FIGS. 36 and 37 diagrammatically illustrate the control valve configured for a five-cycle water softener system with co-current brining but with no bypass of the untreated water during backwash and regeneration. The arrangement of poppet valves is the same as in the embodiment of FIGS. 31 through 35 except that a single face seal poppet valve assembly 165 for controlling the outlet is added in the second open end of the valve body 12. The outlet valve assembly 165 is spring actuated to an open position and is piloted to a closed position by the pilot valve 3. The use of the outlet valve assembly 165 permits the outlet 29 to be closed off during backwash (FIG. 36), brining (not shown), and purge and brine refill (FIG. 37).

Figure 38:
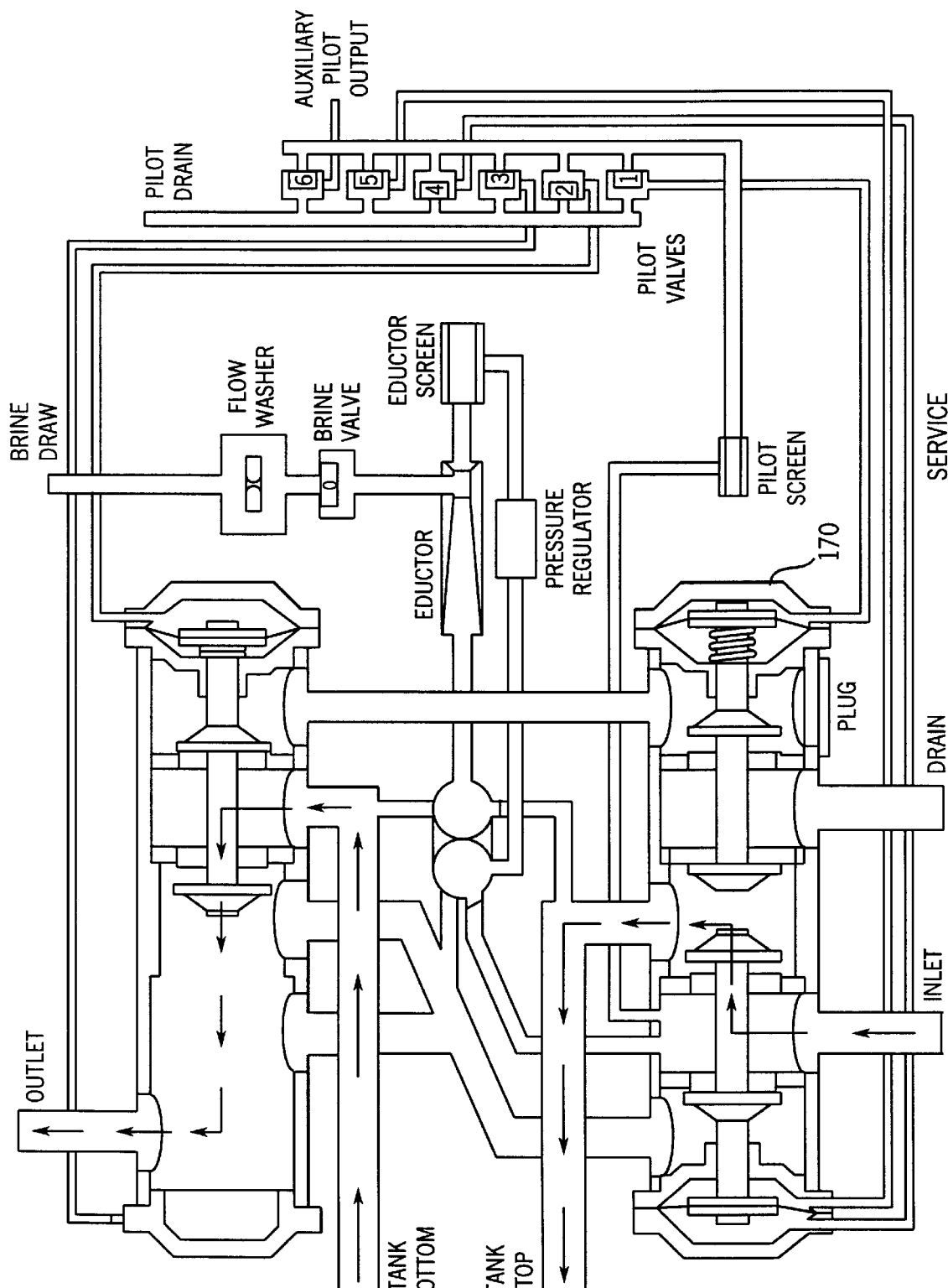
FIG. 38 is a diagrammatic view of the service cycle of the control valve configured for a five-cycle water softener system with hard water bypass and countercurrent flow of regenerative fluid relative to the flow of fluid to be treated.
Figure 39:
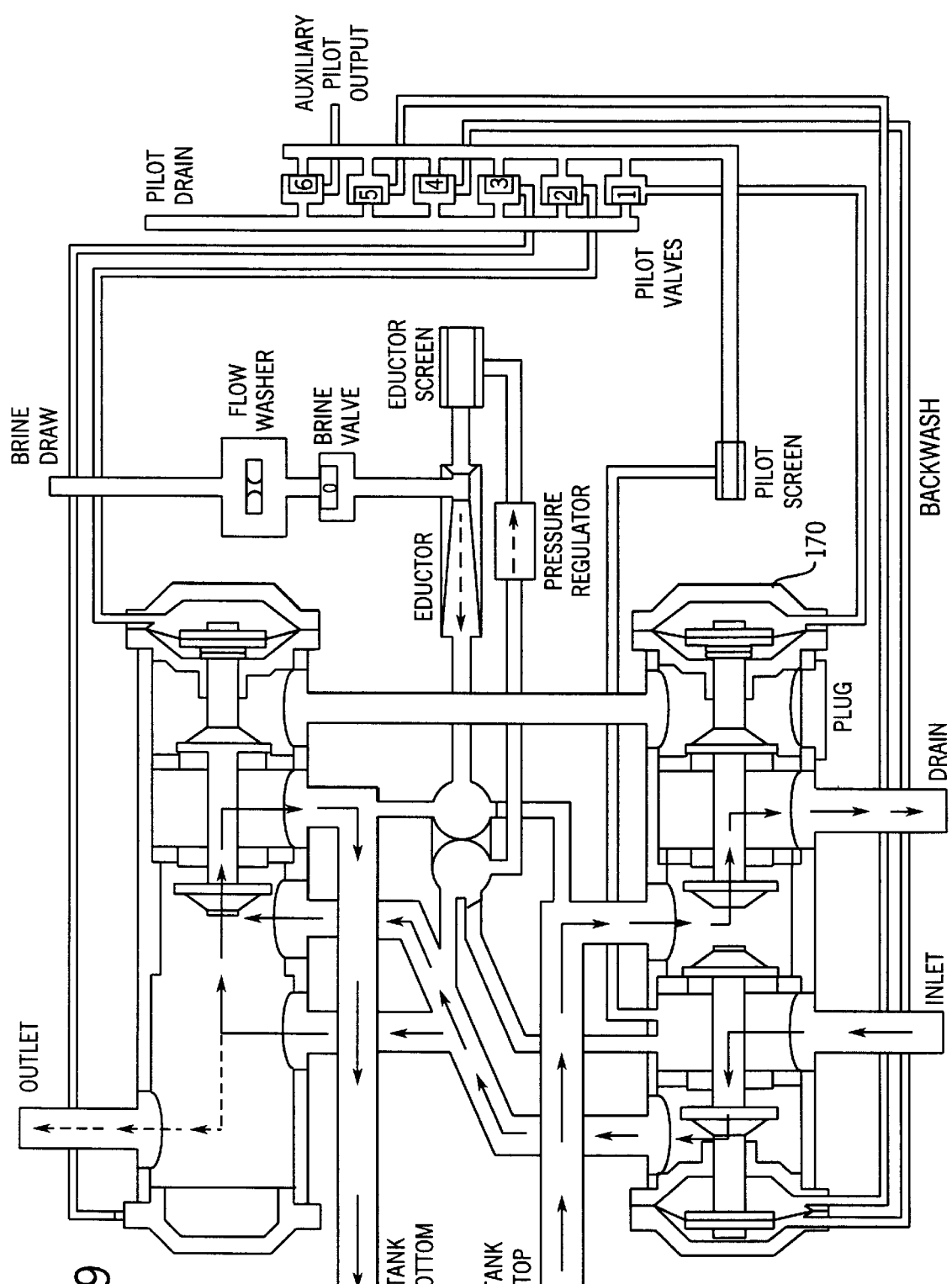
FIG. 39 is a view of the water softener valve of FIG. 38 but showing the backwash cycle.
Figure 40:
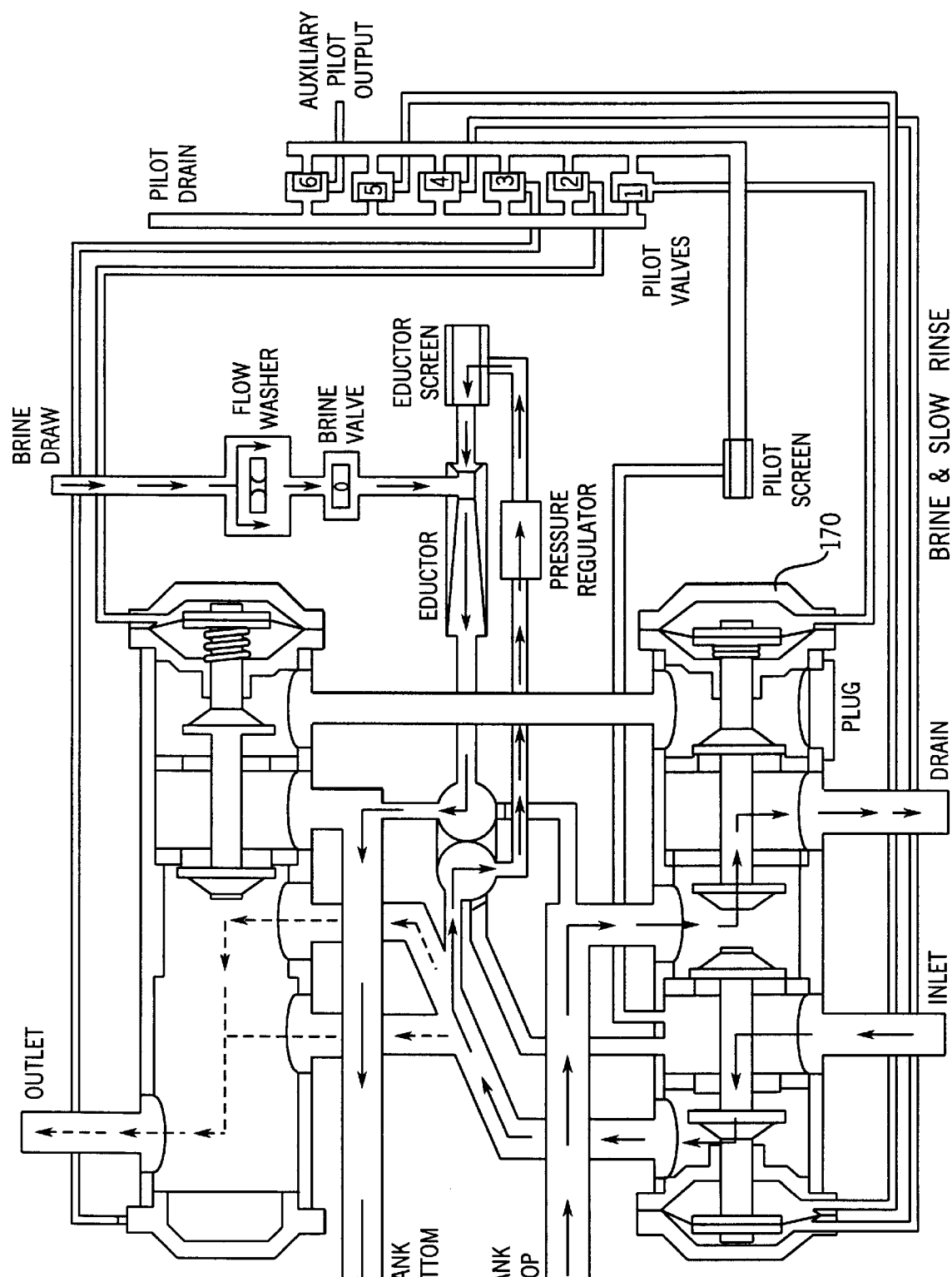
FIG. 40 is a view of the valve of FIG. 38 but showing the brine and slow rinse cycle.
Figure 41:
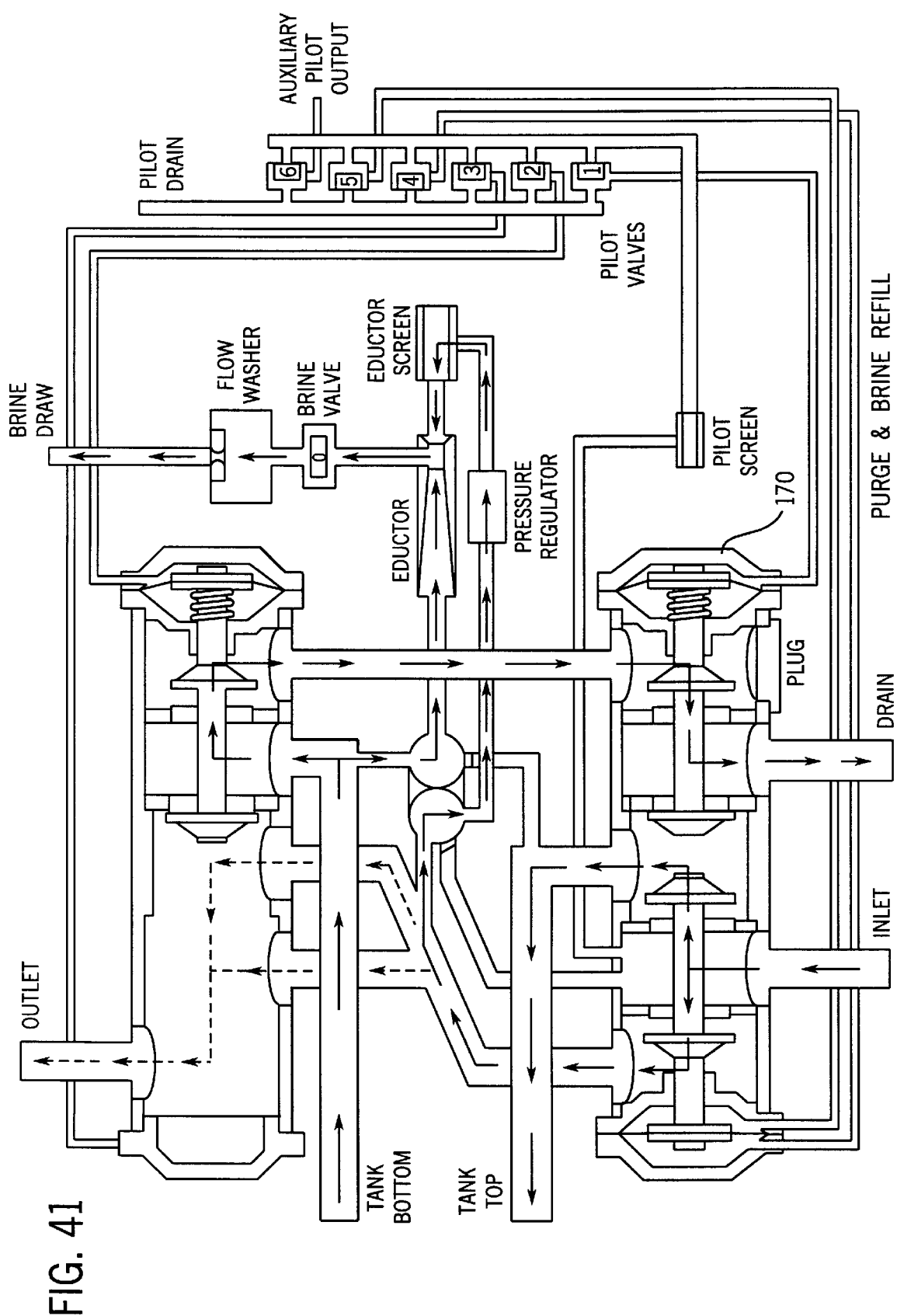
FIG. 41 is a view of the valve of FIG. 38 but showing the purge and brine refill cycle.

FIGS. 38 through 41 show the control valve arranged for a five-cycle water softener system with hard water bypass and with countercurrent flow of brine relative to water to be treated. The arrangement of poppet valves is similar to the embodiment of FIGS. 31 through 35 which uses co-current operation with the exception that a double face seal poppet drain valve assembly 170, which is spring-loaded, replaces the single poppet drain valve assembly 146, and the drain port and plug are relocated. The flow of fluids during service as illustrated in FIG. 38 is the same as for the co-current embodiment in FIG. 31. The flow of fluids during backwash as shown in FIG. 39 is similar to the flow of fluids during the backwash cycle of the co-current arrangement of FIG. 32. However, because the drain 30 is relocated, it is necessary to open a poppet valve of the drain valve assembly 170 by means of the pilot valve 1. During the brine and slow rinse cycle (FIG. 40) the tank adapter 27 directs the flow of brine down the center tube of the tank to the tank bottom. Furthermore, the path to drain is through an open poppet of the drain valve assembly 170 which is connected to the top of the tank. During the purge and brine refill cycle (FIG. 41), the inlet valve assembly 146 and the tank bottom valve assembly 147 are in the same condition as in the purge and brine refill cycle (FIG. 34) of co-current flow. However, the drain valve assembly 170 is moved by its return spring to a position where the drain 30 is connected through the drain valve assembly 170 and the tank bottom valve assembly 148. This results from the closing of the pilot valve 1.

Figure 42:
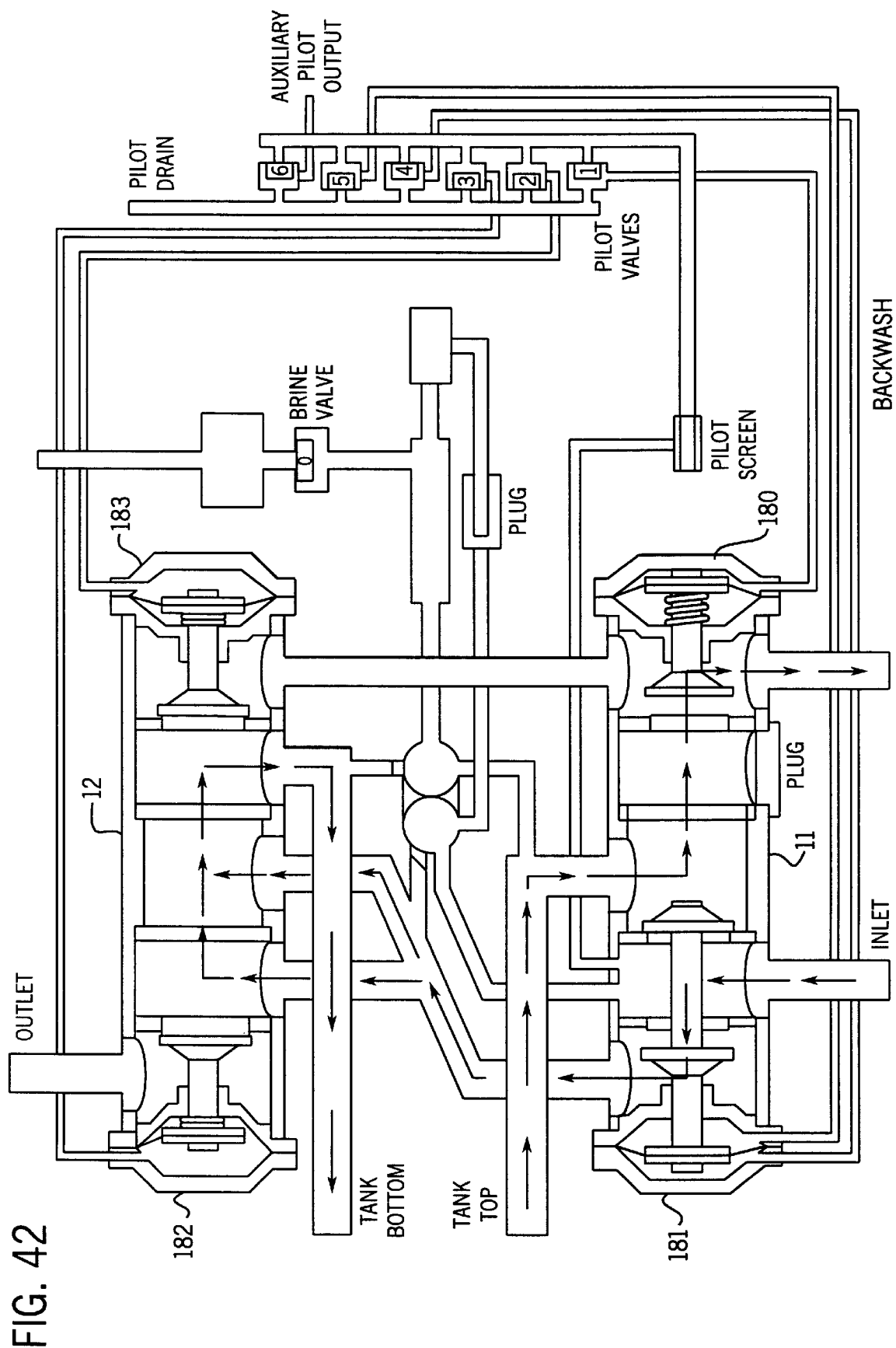
FIG. 42 is a diagrammatic view of the control valve arranged as a three-cycle filter valve with no unfiltered water bypass and illustrating the backwash cycle.

Thus far, the control valve has been described as being configured for operation on a water softener or other regenerable bed. The control valve can also be readily adapted for use on a filter bed that requires no regeneration but a simple backwash. The configuration of the control valve for this purpose is shown in FIG. 42. In this configuration, there is a spring-loaded single face seal poppet drain assembly 180 at one end of the valve body 11 and a double face seal poppet pilot controlled inlet valve 181 on the other end. In the second valve body 12, a single face seal poppet spring-loaded valve assembly 182 is mounted at one end and a similar spring-loaded single face seal poppet valve assembly 183 is mounted at the other end. Since a regenerative fluid is not required, the brine valve remains closed, and there is no connection to a source of brine. FIG. 42 shows the backwash cycle of the valve construction in which no unfiltered water can reach the outlet during the backwash. If filtered water is to be allowed to reach the outlet during backwash, the spring-loaded single face seal poppet valve 182 that controls the outlet would be removed and replaced with a simple end cap.

We claim:

1. A control valve for a fluid treatment system that includes a treatment bed, comprising:

an array of pilot valves;

a timer mechanism for actuating the pilot valves in a controlled sequence;

a manifold connectable to the bed;

a pair of open-ended cylindrical valve bodies attached to the manifold and having ports in fluid communication with passages in the manifold; and poppet valve assemblies received into certain of the open ends of the valve bodies and including valve actuators in fluid communication with respective ones of the pilot valves.

2. A control valve in accordance with claim 1 wherein the poppet valve assemblies include single face seal poppet valves and double face seal poppet valves.

3. A control valve in accordance with claim 2 wherein there being for each poppet valve assembly including double poppet valves a pair of valve seats disposed on either side of a port in one of the valve bodies and the double poppet valves are disposed on the sides of the valve seats away from the port.

4. A control valve in accordance with claim 3 wherein the double poppet valves are moved to a position sealing one valve seat while the other valve seat is open by piloting pressure, and the double poppet valves are moved by a spring to a second position opening the one valve seat and closing the other valve seat.

5. A control valve in accordance with claim 3 wherein for each valve actuator, the valve actuator is a diaphragm exposed on each side to piloting pressure from a respective pilot valve, said diaphragm being moved by pilot pressure between extreme positions in which one of the valve seats is open while the other valve seat is closed and to a neutral position in which both valve seats are open.

6. A control valve in accordance with claim 1 wherein the poppet valve assemblies include valve seats and poppet valves against which the poppet valves can seat.

7. A control valve in accordance with claim 6 wherein the valve seats are formed on one side of rings carrying seals that seal with the interior of the valve bodies at longitudinal positions located between ports in the valve bodies.

8. A control valve in accordance with claim 7 wherein the poppet valves are mounted on stems that extend longitudinally of the valve bodies.

9. A control valve in accordance with claim 8 wherein the actuators are diaphragms connected to the valve stems and disposed in chambers in fluid communication with the pilot valves.

10. A control valve in accordance with claim 9 wherein for each valve actuator, a spring is disposed in one chamber to urge the diaphragm to one position.

11. A control valve in accordance with claim 9 wherein the diaphragm chambers are formed by an inner chamber housing and an outer chamber housing, the inner chamber housing mounting a cage that extends about the valve stem and mounts the rings.

12. A control valve in accordance with claim 9 together with means for purging air from the chambers when the chambers fill with fluid from the pilot valves.

13. A control valve in accordance with claim 9 wherein each chamber is formed by an inner chamber housing and an outer chamber housing joined together at their perimeters, and the diaphragm has a rim that is trapped between the joined housings.

14. A control valve in accordance with claim 13 wherein the chamber housings each have an orifice that leads from a pilot port to a circular recess that is located inwardly of the diaphragm rim.

15. A control valve in accordance with claim 14 wherein radial passages are provided at four quadrants in each chamber housing, said radial passages extending from a respective chamber to the circular recess.

16. A control valve in accordance with claim 1 wherein the manifold includes pilot passages leading from the pilot valves to each open end of the valve bodies, and the poppet valve assemblies each include passages that connect to the pilot passages.

17. A control valve in accordance with claim 1 together with one or more caps closing off the open ends of the valve bodies that do not include poppet valve assemblies.

18. A control valve for a fluid treatment system that includes a tank having a treatment bed that requires periodic regeneration from a source of regenerative fluid, comprising:

a manifold having fluid passages adapted for communication to the top and bottom of the treatment bed and to the source of regenerative fluid;

a tank adapter for connecting the manifold to the tank;

an array of pilot valves;

a timer mechanism for actuating the pilot valves in a controlled sequence;

a pair of open-ended cylindrical valve bodies attached to the manifold and having ports in fluid communication with the passages in the manifold; and poppet valve assemblies received into the open ends of the valve bodies, said valve assemblies including valve seats, poppet valves and valve actuators in communication with respective ones of the pilot valves.

19. A control valve in accordance with claim 18 wherein the tank adapter contains passages that are connectable to the manifold in two alternate alignments such that the source of regenerative fluid can be connected to the top or to the bottom of the treatment bed so that co-current and countercurrent flow of regenerative fluid and the fluid to be treated can be alternately selected.

20. A control valve in accordance with claim 18 wherein the pilot valves are flapper valves having valve stems that are engaged by cams on a rotating cam shaft driven by the timer mechanism.

21. A control valve in accordance with claim 20 together with valves for connecting the source of regenerative fluid to manifold passages, the valves comprising a pair of additional flapper valves engageable by the cam shaft and arranged in parallel with one flapper valve opening a smaller orifice against pressure before the second flapper valve opens a larger orifice against pressure.

22. A control valve for a fluid treatment system that includes a treatment bed, comprising:

an array of pilot valves extending in one direction from an upstanding wall;

a timer mechanism for actuating the pilot valves in a controlled sequence, said timer mechanism including a housing being removable mounted on the wall and extending in an opposite direction;

a manifold connectable to the bed;

a pair of open-ended cylindrical valve bodies attached to the manifold and having ports in fluid communication with passages in the manifold; and poppet valve assemblies received into the open ends of the valve bodies and including valve actuators in fluid communication with respective ones of the pilot valves.

23. A control valve in accordance with claim 22 wherein the timer mechanism housing has two pairs of spaced brackets, the brackets being arranged to receive the wall in alternate positions in which a bracket of each pair is on each side of the wall or one pair of brackets is on one side of the wall and the other pair of brackets is on the other side of the wall.

24. A control valve for a fluid treatment system that includes a treatment bed in a container, comprising:

an array of pilot valves;

a mechanism for actuating the pilot valves in a controlled sequence;

a manifold connectable to the container;

an open-ended cylindrical valve body attached to the manifold and having ports in fluid communication with passages in the manifold; and a selection of interchangeable poppet valve assemblies adapted to be received into the open ends of the valve body, each of the poppet valve assemblies including a valve actuator adapted to be connected in fluid communication with respective ones of the pilot valves.

25. A control valve in accordance with claim 24 wherein the poppet valve assemblies contain single face seal poppet valves or double face seal poppet valves.

26. A control valve according to claim 24 wherein the manifold includes pilot passages leading from the pilot valves to each open end of the valve body and the poppet valve assemblies each include passageways that connect to the pilot passages in the manifold.

27. A control valve according to claim 24 together with an end cap interchangeable with the poppet valve assemblies for closing off an unused open end of the cylindrical valve body.

28. A kit of parts for a control valve for treating a fluid treatment bed contained in a tank, comprising:

an array of pilot valves in a housing;

a timer mechanism connectable to the pilot valve housing for actuating the pilot valves in a controlled sequence;

a manifold mounting the pilot valve housing and including operating passages connectable to the tank and pilot passages leading from the pilot valves;

multiple open-ended cylindrical valve bodies attached to the manifold and including ports in fluid communication with the operating passages in the manifold and pilot passageways at the open ends that connect with the pilot passages in the manifold;

a selection of interchangeable single and double poppet valve assemblies mountable in the open ends of the valve bodies and each communication with the pilot passageways; and an end cap for closing the open end of a valve body that does not include a poppet valve assembly.

* * * * *